(12) United States Patent

Gonzalez Sanchez et al.

(10) Patent No.: US 12,651,167 B2

(45) Date of Patent: Jun. 9, 2026

(54) PRIVACY PRESERVATION IN NEURAL NETWORKS

(71) Applicant: NEC Laboratories Europe GmbH, Heidelberg (DE)

(72) Inventors: Roberto Gonzalez Sanchez, Heidelberg (DE); Vittorio Prodomo, Leganes (ES); Marco Gramaglia, Leganes (DE)

(73) Assignee: NEC CORPORATION, Tokyo (JP)

( * ) Notice: Subject to any disclaimer, the term of this patent is extended or adjusted under 35 U.S.C. 154(b) by 736 days.

(21) Appl. No.: 18/066,298

(22) Filed: Dec. 15, 2022

(65) Prior Publication Data

US 2024/0119289 A1 Apr. 11, 2024

Related U.S. Application Data

(60) Provisional application No. 63/410,643, filed on Sep. 28, 2022.

(51) Int. Cl.
G06N 3/082 (2023.01)

(52) U.S. Cl.
CPC .................................. G06N 3/082 (2013.01)

(58) Field of Classification Search
CPC ..................................................... G06N 3/082
See application file for complete search history.

(56) References Cited

U.S. PATENT DOCUMENTS

2021/0306461 A1* 9/2021 Scott ....................... H04L 67/63
2021/0334722 A1* 10/2021 Di Lorenzo ........... G06Q 10/00
2023/0376829 A1* 11/2023 Giovannini ............ G06N 20/00
2024/0338573 A1* 10/2024 Li ........................... H04L 67/34

OTHER PUBLICATIONS

Ahu et al "A New Loss Function for CNN Classifier Based on Predefined Evenly-Distributed Class Centroids" (Year: 2019).*
A New Loss Function for CNN Classifier Based on Predefined Evenly-Distributed Class Centroids (Year: 2019).*
Osia, Seyed Ali et al.; "A hybrid deep learning architecture for privacy-preserving mobile analytics"; *IEEE Internet of Things Journal*; May 2020; pp. 4505-4518; vol. 7, No. 5; IEEE; Piscataway, NJ, USA.
Mireshghallah, Fatemehsadat et al.; "A principled approach to learning stochastic representations for privacy in deep neural inference"; *Computer Science*; Mar. 20, 2020; pp. 1-16; ArXiv.org; Cornell University; Ithaca, NY, USA.

(Continued)

*Primary Examiner* — Tarek Chbouki

(74) *Attorney, Agent, or Firm* — Leydig, Voit & Mayer, Ltd.

(57) ABSTRACT

A method for privacy preservation for machine learning networks includes splitting a trained neural network into a first part and a second part. The first part is a privacy preservation (PP) encoder and the second part is a PP machine learning (ML) model. The method further includes retraining the PP encoder and the PP ML model. The method can improve artificial intelligence (AI) systems, optimize performance and support decision making in use cases including, but not limited to medical/healthcare, fraud detection, image recognition, predictive maintenance and connected vehicles.

16 Claims, 16 Drawing Sheets

Splitting a trained neural network into two parts, wherein the two parts comprise a privacy preservation encoder and a privacy preservation machine learning model — 702

Retraining the privacy preservation encoder and the privacy preservation machine learning model — 704

Subsequent to the retraining, providing the retrained privacy preserving encoder to a client device — 706

(56)          References Cited

OTHER PUBLICATIONS

Mireshghallah, Fatemehsadat et al.; "Shredder: Learning noise distributions to protect inference privacy"; *Proceedings of the Twenty-Fifth International Conference on Architectural Support for Programming Languages and Operating Systems*; Sep. 28, 2019; pp. 1-9; vol. 2; ArXiv.org; Cornell University; Ithaca, NY, USA.

Simonyan, Karen et al.; "Very deep convolutional networks for large-scale image recognition"; *International Conference on Learning Representations 2015*; Apr. 10, 2015; pp. 1-14; vol. 6; ArXiv. org; Cornell University; Ithaca, NY, USA.

Deng, Jia et al.; "Imagenet: A large-scale hierarchical image database" ; *2009 IEEE conference on computer vision and pattern recognition*; Aug. 18, 2009; pp. 1-8; IEEE; Piscataway, NJ, USA.

Wen, Yandong et al.; "A discriminative feature learning approach for deep face recognition"; *European conference on computer vision*; Sep. 16, 2016; pp. 499-515; Part VII of LNCS; vol. 9911; Springer International Publishing AG; Berlin—Heidelberg, Germany.

Fedus, William, et al., "Switch Transformers: Scaling to Trillion Parameter Models with Simple and Efficient Sparsity," Journal of Machine Learning Research 23, arXiv:2101.03961v3, pp. 1-40, Jun. 16, 2022, US.

* cited by examiner

100

150

200

510

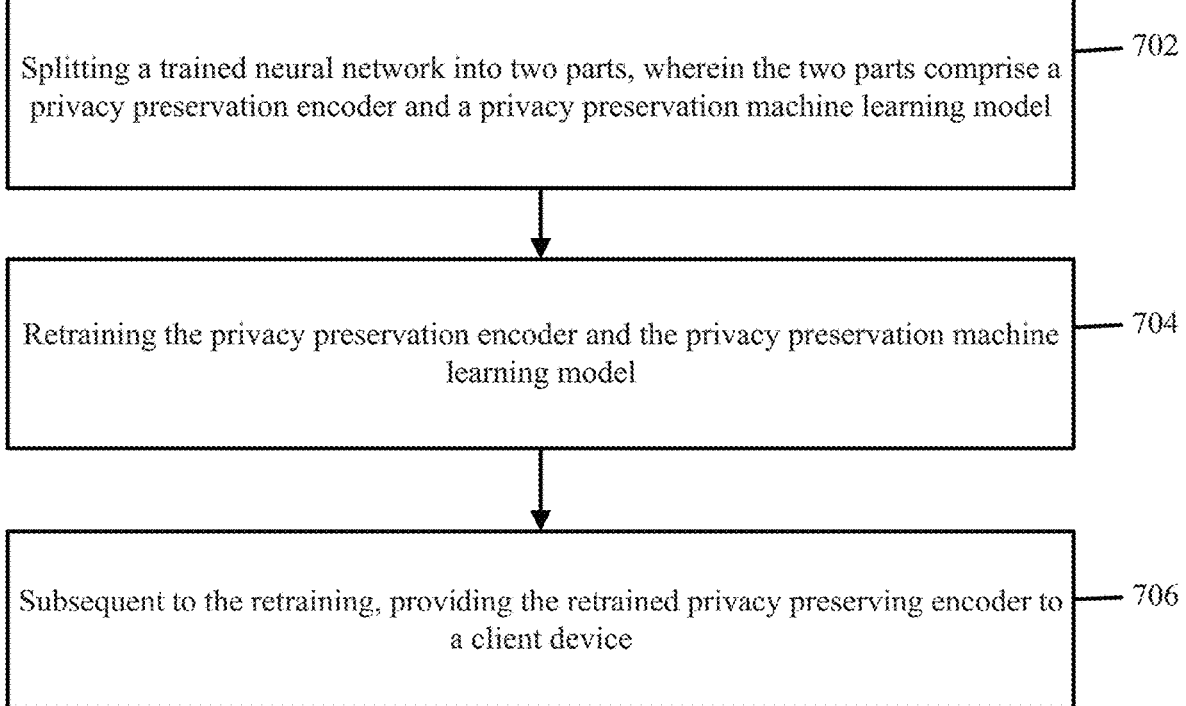

Splitting a trained neural network into two parts, wherein the two parts comprise a privacy preservation encoder and a privacy preservation machine learning model — 702

Retraining the privacy preservation encoder and the privacy preservation machine learning model — 704

Subsequent to the retraining, providing the retrained privacy preserving encoder to a client device — 706

(a) MNIST dataset (b) CelebA dataset

1100

1200

1300

1400

PRIVACY PRESERVATION IN NEURAL NETWORKS

CROSS-REFERENCE TO PRIOR APPLICATION

Priority is claimed to U.S. Provisional Application No. 63/410,643, filed on Sep. 28, 2022, the entire contents of which is hereby incorporated by reference herein.

FIELD

The present invention relates to artificial intelligence (AI) and machine learning (ML), and in particular to a method, system, and computer-readable medium for preserving privacy in a neural network (NN).

BACKGROUND

The complexity and size of machine learning models is growing over time. Recent examples, such as GENERATIVE PRE-TRAINED TRANSFORMER 3 (GPT-3) with 175 billion (B) parameters or MEGATRON-TURING with 530B, have presented models that are impossible to generate or even maintain for most companies in the world, much less academia or personal users. Moreover, there is expected to be a similar growth in the next years (see, e.g., Fedus, William, et al., "Switch Transformers: Scaling to Trillion Parameter Models with Simple and Efficient Sparsity," Journal of Machine Learning Research 23, arXiv:2101.03961v3, pp. 1-40 (Jun. 16, 2022), which are hereby incorporated by reference herein). This progression, together with the slowdown on production of new hardware, severely limits the capacity of small and also even large enterprises to use the latest advances in natural language processing (NLP), image recognition, or other complex machine learning tasks.

Some big technology (tech) companies have started to offer their models in a Machine Learning as a Service (MLaaS) fashion. In this fashion, the big tech companies operate the gigantic machine learning models on their premises and allow customers (e.g., clients) to query the model for a pre-negotiated fare. This model is convenient for customers that do not have the ability to create their own complex model (e.g., because they do not have a tagged dataset), to customers that require to execute (even simple) machine learning tasks using limited devices (e.g., hardware constrained devices) such as mobile phones or Internet of Things (IoT) devices. However, to perform a query, the customer sends the raw data (e.g., an image) to the service provider. While this operation might not present significant problems in certain tasks (e.g., a connected vehicle sending telemetry data for predictive maintenance), it certainly has heavy privacy/confidentiality implications in others (e.g., a surveillance system requesting image classification services).

SUMMARY

In an embodiment, the present disclosure provides a method for privacy preservation for machine learning networks. The method comprises: splitting a trained neural network into a first part and a second part, wherein the first part is a privacy preservation (PP) encoder and the second part is a PP machine learning (ML) model; and retraining the PP encoder and the PP ML model. The method can improve artificial intelligence (AI) systems, optimize performance and support decision making in use cases including, but not limited to medical/healthcare, fraud detection, image recognition, predictive maintenance and connected vehicles.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 7 illustrates a process for privacy preservation according to an embodiment of the present disclosure;

DETAILED DESCRIPTION

Figure 1A:
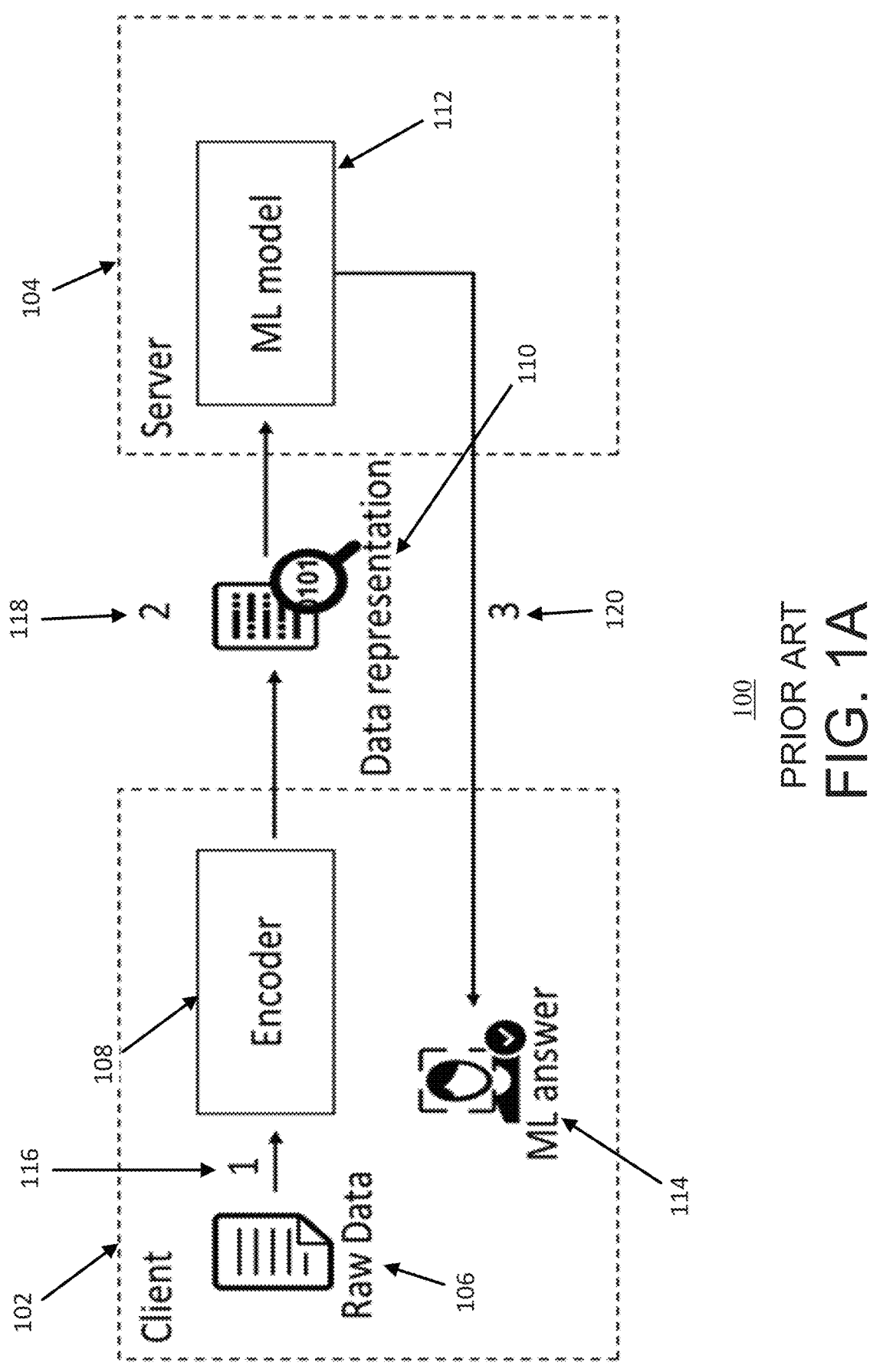
FIG. 1A schematically illustrates a prior art method and system for providing privacy preservation in a MLaaS system.

Embodiments of the present invention provide a method, system and computer-readable medium that enable querying of machine learning (ML) models, in particular ML models based on neural networks, in a privacy preserving way (e.g., without sending the raw data). Embodiments of the present invention further provide improvements such as the usage of already trained neural network (NN) models, the ability to split the already trained NN in parts to be executed by client and server, and the provision of a privacy preserving encoder. All of these improvements can be achieved according to embodiments of the present invention without increasing significantly the complexity of the resulting system.

In an embodiment, the present invention provides a method for privacy preservation for machine learning networks, the method comprising: splitting a trained neural network into a first part and a second part, wherein the first part is a privacy preservation (PP) encoder and the second part is a PP machine learning (ML) model; and retraining the PP encoder and the PP ML model.

In an embodiment, the method further comprises: subsequent to retraining the PP encoder and the PP ML model, providing the PP encoder to a client device; and receiving a data representation of raw data from the client device, the data representation having been generated based on the raw data input into the PP encoder by the client device.

In an embodiment, the method further comprises: inputting the data representation of the raw data into the PP ML model to generate a ML answer; and providing the ML answer to the client device.

In an embodiment, the trained neural network is used for image recognition, and wherein the raw data comprises one or more raw images and the data representation of the raw data is a vector representation of the one or more raw images.

In an embodiment, splitting the trained neural network into the first part and the second part comprises: determining a split point between two layers of the trained neural network; and splitting the trained neural network using the split point, wherein the first part is a first set of layers with a layer at an input of the trained neural network, and wherein the second part is a second set of layers with a layer at an output of the trained neural network.

In an embodiment, retraining the PP encoder and the PP ML model comprises: retraining parameters of the first set of layers using a new loss function, wherein the new loss function decreases an intra-class distance of output from the PP encoder; and retraining parameters of the second set of layers using the new loss function.

In an embodiment, retraining the PP encoder and the PP ML model comprises: providing a dimension reduction block and an intra-class distance reduction layer after the PP encoder, wherein the dimension reduction block and the intra-class distance reduction layer are used to retrain the PP encoder.

In an embodiment, retraining the PP encoder and the PP ML model further comprises: providing the PP ML model and an inter-class distance maximization layer after the PP encoder, wherein the PP ML model and the inter-class distance maximization layer are parallel to the dimension reduction block and the intra-class distance reduction layer, and wherein the PP ML model and the inter-class distance maximization layer are used to retrain the PP encoder.

In an embodiment, retraining the PP encoder and the PP ML model further comprises: determining an intra-class reduction loss based on the dimension reduction block and the intra-class distance reduction layer; determining an inter-class maximization loss based on the dimension reduction block and the intra-class distance reduction layer; and retraining parameters of the PP encoder based on using a loss function, the intra-class reduction loss, the inter-class maximization loss, and a lambda coefficient.

In an embodiment, retraining the PP encoder and the PP ML model further comprises: freezing parameters of the intra-class distance reduction layer; and based on freezing the parameters of the intra-class distance reduction layer, performing back-propagation using the PP ML model and the inter-class distance maximization layer to retrain the PP encoder and the PP ML model.

In an embodiment, retraining the PP encoder and the PP ML model further comprises: freezing parameters of the intra-class distance reduction layer; and based on freezing the parameters of the intra-class distance reduction layer, performing back-propagation using the PP ML model and the inter-class distance maximization layer to retrain the PP encoder and the PP ML model.

In an embodiment, retraining the PP encoder and the PP ML model further comprises: based on determining that the retraining of the PP encoder and the PP ML model are not finished: iteratively freezing either parameters of the intra-class distance reduction layer or parameters of the intra-class distance reduction layer; and performing back-propagation to continue retraining of the PP encoder and the PP ML model; and based on determining that the retraining of the PP encoder and the PP ML model has finished: providing the retrained PP encoder to a client device for use for a ML task.

In another embodiment, a system comprising one or more hardware processors which, alone or in combination, are configured to execute the method for privacy preservation according to any embodiment of the present invention In a further embodiment, a tangible, non-transitory computer-readable medium having instructions thereon which, upon being executed by one or more processors, alone or in combination, provide for execution of a method according to any embodiment of the present invention.

In yet another embodiment, a system is provided. The system comprises a server configured to: split a trained neural network into a first part and a second part, wherein the first part is a privacy preservation (PP) encoder and the second part is a PP machine learning (ML) model; retrain the PP encoder and the PP ML model; provide the PP encoder to a client device; receive a data representation from the client device; and provide an ML answer based on the retrained PP ML model and the data representation. The server further comprises a client device configured to: input raw data into the PP encoder to generate the data representation of the raw data; provide the data representation to the server; and receive the ML answer.

FIG. 1A schematically illustrates a prior art method and system to provide privacy preservation in a MLaaS system. According to existing technology, to perform a query, a client 102 (e.g., a customer) of Machine Learning as a Service (MLaaS) provides the raw data (e.g., an image) to a server 104 (e.g., a service provider that owns, manages, and/or is otherwise associated with the server 104). While this operation may not present significant issues when performing certain tasks (e.g., a connected vehicle sending telemetry data for predictive maintenance), it may have heavy privacy/confidentiality implications in others tasks (e.g., a surveillance system requesting image classification services). Some techniques have been designed in the past years to provide privacy by executing some kind of encoding or masquerading in the client data before the information is transferred to the server. FIG. 1A represents a typical process and system 100 that is used. For instance, at a first step 116, the client 102 (e.g., a client device such as a user device) uses an encoder 108 to create a data representation 110 of the raw data 106 (e.g., encode the raw data 106 to generate the data representation 110). At the second step 118, the client 102 sends (e.g., provides) the data representation 110 to the server 104 that queries the ML model 112. Finally, at a third step 120, the server 104 returns the ML answer 114 output by the ML model 112 to the client 102. As such, a technical problem to be solved here in recent years is how to generate an encoder 108 and an ML model 112 in a way that ensures the privacy on the data representation without significantly limiting and impacting the accuracy of the machine learning task. Currently, the existing solutions with the existing encoder (e.g., the prior art encoder 108 and the prior art ML model 112) that target this technical problem either greatly increase the complexity of the network, which is not feasible for huge models such as GPT-3, or severely damage the accuracy of the machine learning task (see, e.g., Osia, Seyed Ali, et al., "A hybrid deep learning architecture for privacy-preserving mobile analytics." IEEE Internet of Things Journal 7.5, pp. 4505-4518 (2020); Mireshghallah, Fatemehsadat, et al., "A principled approach to learning stochastic representations for privacy in deep neural inference," arXiv preprint arXiv: 2003.12154 (2020); and Mireshghallah, Fatemehsadat, et al., "Shredder: Learning noise distributions to protect inference privacy," Proceedings of the Twenty-Fifth International Conference on Architectural Support for Programming Languages and Operating Systems (2020), each of which is hereby incorporated by reference herein).

Figure 1B:
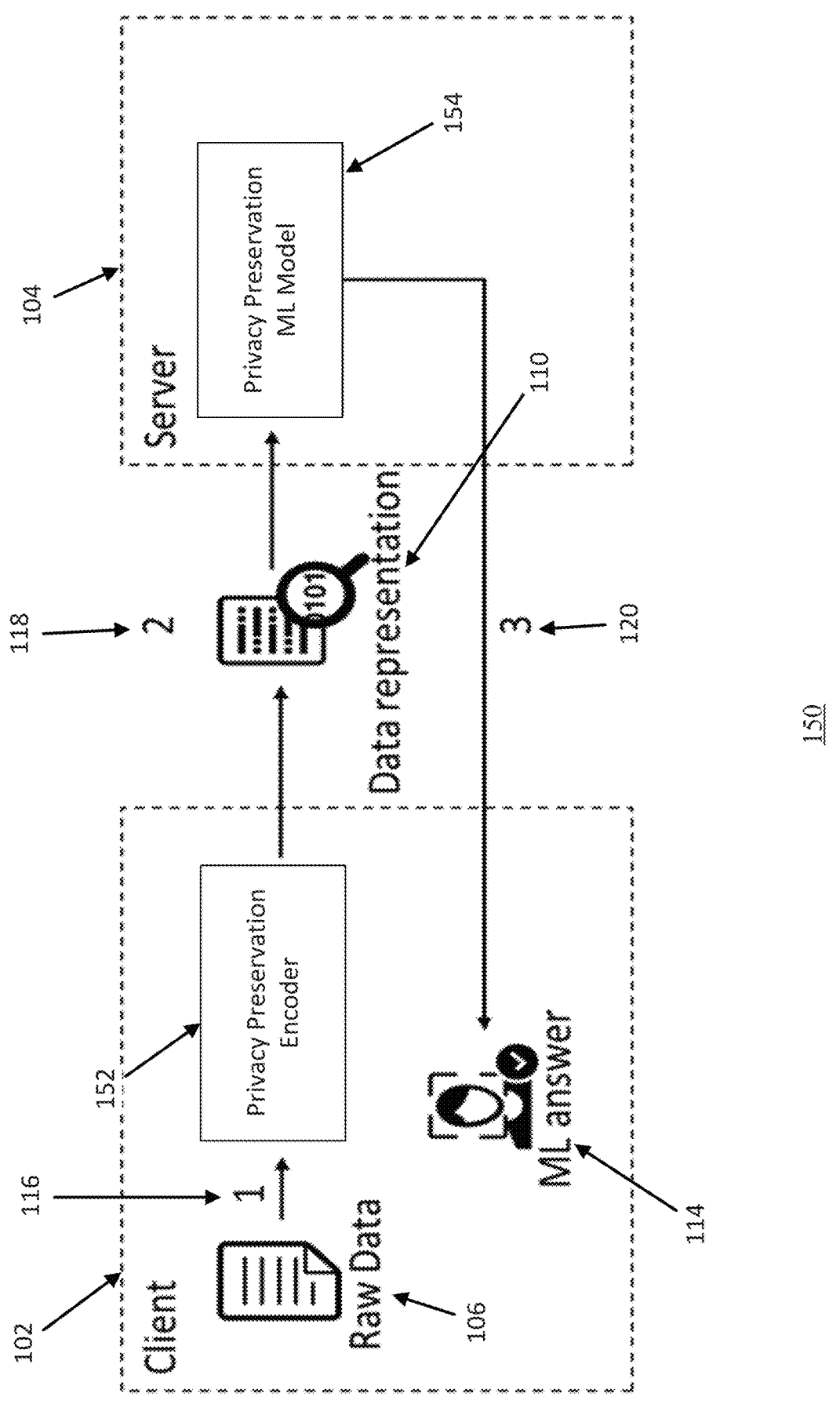
FIG. 1B schematically illustrates a method and system for providing privacy preserving according to an embodiment of the present invention.

Accordingly, embodiments of the present invention provide an improved technical solution for preserving privacy that does not significantly increase complexity or adversely impact accuracy. For instance, embodiments of the present invention provide a way to create (e.g., determine, generate, and/or otherwise provide) an encoder and ML model from a pre-trained NN model in a way that the privacy preservation encoder and ML model provide privacy in the data transferred to the server without destroying the quality of the data for a given machine learning task. FIG. 1B schematically illustrates a method and system to provide privacy preserving machine learning according to an embodiment of the present invention. For instance, FIG. 1B shows a system 150 with a client 102 and a server 104 that is similar to FIG. 1A. However, the system 150 includes a client 102 with a privacy preservation (PP) encoder 152 and a privacy preservation (PP) ML model 154 of the present invention. By using the PP encoder 152 and the PP ML model 154, the present invention provides a privacy preserving solution that does not significantly increase complexity or adversely impact accuracy. This will be explained in further detail below.

Given an already trained neural network model, such as Visual Geometry Group 16 (VGG16) (see, e.g., Simonyan, Karen, et al., "Very deep convolutional networks for large-scale image recognition," arXiv preprint arXiv:1409.1556 (2014), which is hereby incorporated by reference herein) or Imagenet (see, e.g., Deng, Jia, et al., "Imagenet: A large-scale hierarchical image database." 2009 IEEE Conference on Computer Vision and Pattern Recognition (2009), which is hereby incorporated by reference herein), embodiments of the present invention splits the neural network after any of the relevant neural network layers and to retrains the network (e.g., the NN) in a specific way.

Figure 2:
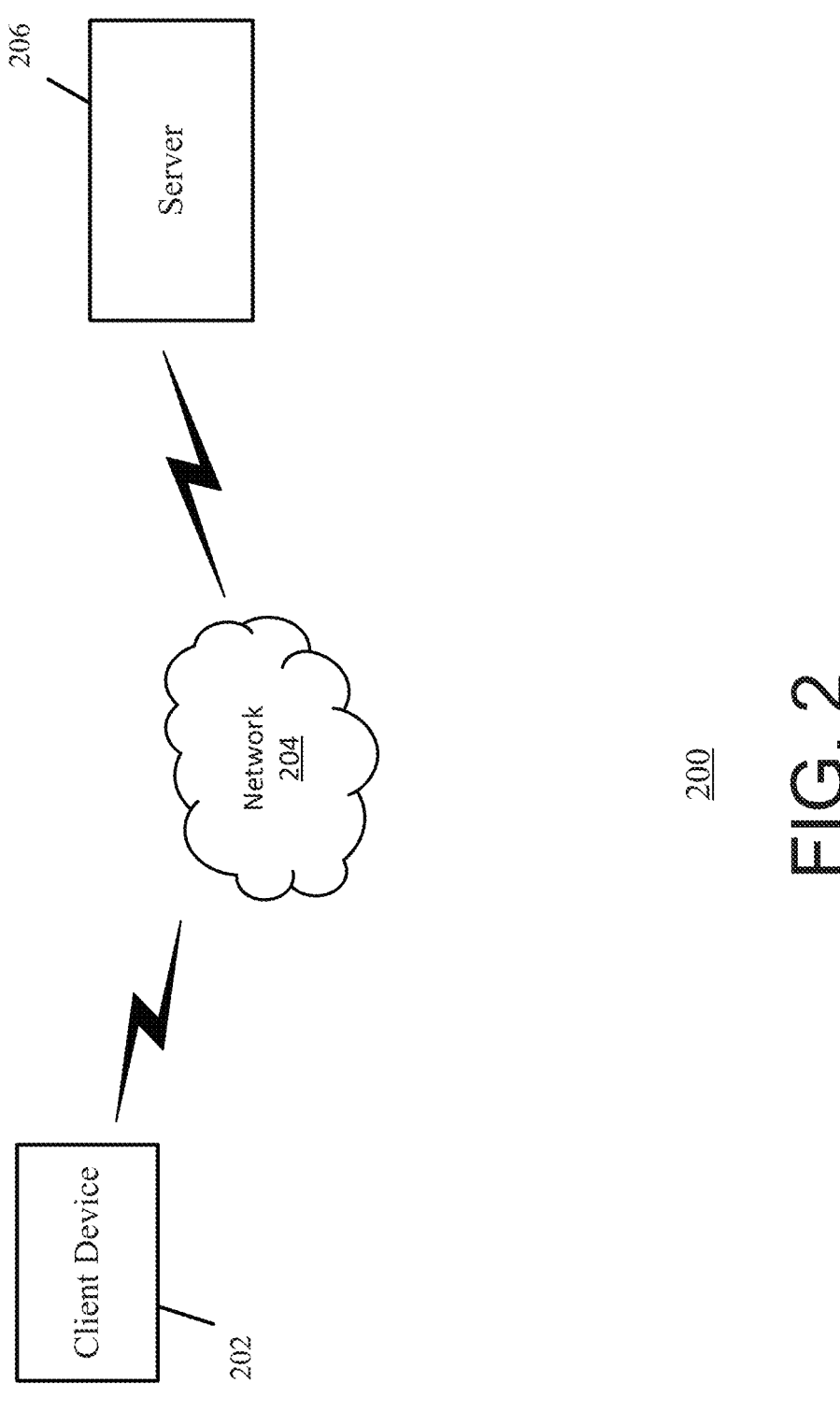
FIG. 2 illustrates a simplified block diagram depicting an exemplary computing environment according to an embodiment of the present disclosure.

FIG. 2 illustrates a simplified block diagram depicting an exemplary computing environment according to an embodiment of the present disclosure. The environment 200 includes a client device 202, a network 204, and a server 206 (e.g., a cloud server or cloud computing system). Although certain entities within environment 200 are described below and/or depicted in the FIGS. as being singular entities, it will be appreciated that the entities and functionalities discussed herein can be implemented by and/or include one or more entities.

The entities within the environment 200 are in communication with other devices and/or systems within the environment 200 via the network 204. The network 204 can be a global area network (GAN) such as the Internet, a wide area network (WAN), a local area network (LAN), or any other type of network or combination of networks. The network 204 can provide a wireline, wireless, or a combination of wireline and wireless communication between the entities within the environment 200.

The client device 202 is a computing device that is operated by a client or customer of a service provider that owns, manages, and/or is otherwise associated with the server 206. In some instances, the client device 202 is the client 102 shown in FIG. 1B (e.g., the client 102 that includes the PP encoder 152). The client device 202 is and/or includes, but is not limited to, a desktop, laptop, tablet, mobile device (e.g., smartphone device, or other mobile device), server, computing system and/or other types of computing entities that generally comprises one or more communication components, one or more processing components, and one or more memory components.

The server 206 is a computing system that performs one or more functions described herein. For instance, the server 206 can include, execute, operate, and/or otherwise be associated with an MLaaS. In some examples, the server 206 is the server 104 shown in FIG. 1B. The server 206 includes and/or is implemented using one or more computing devices, computing platforms, cloud computing platforms, systems, servers, and/or other apparatuses. In some instances, the server 206 can be implemented as engines, software functions, and/or applications. For example, the functionalities of the server 206 can be implemented as software instructions stored in storage (e.g., memory) and executed by one or more processors.

In operation, a computing entity (e.g., the server 206 and/or another computing device) generates or creates a PP encoder 152 based on a pre-trained NN model. For instance, the server 206 splits the pre-trained NN model into two or more sections with each section including one or more layers of the NN. Subsequently, the server 206 re-trains one or more of the sections of the split NN to obtain the PP encoder 152. The server 206 provides the PP encoder 152 to the client device 202, and the client device 202 uses the PP encoder 152 for the MLaaS. This will be described in further detail below.

Figure 3:
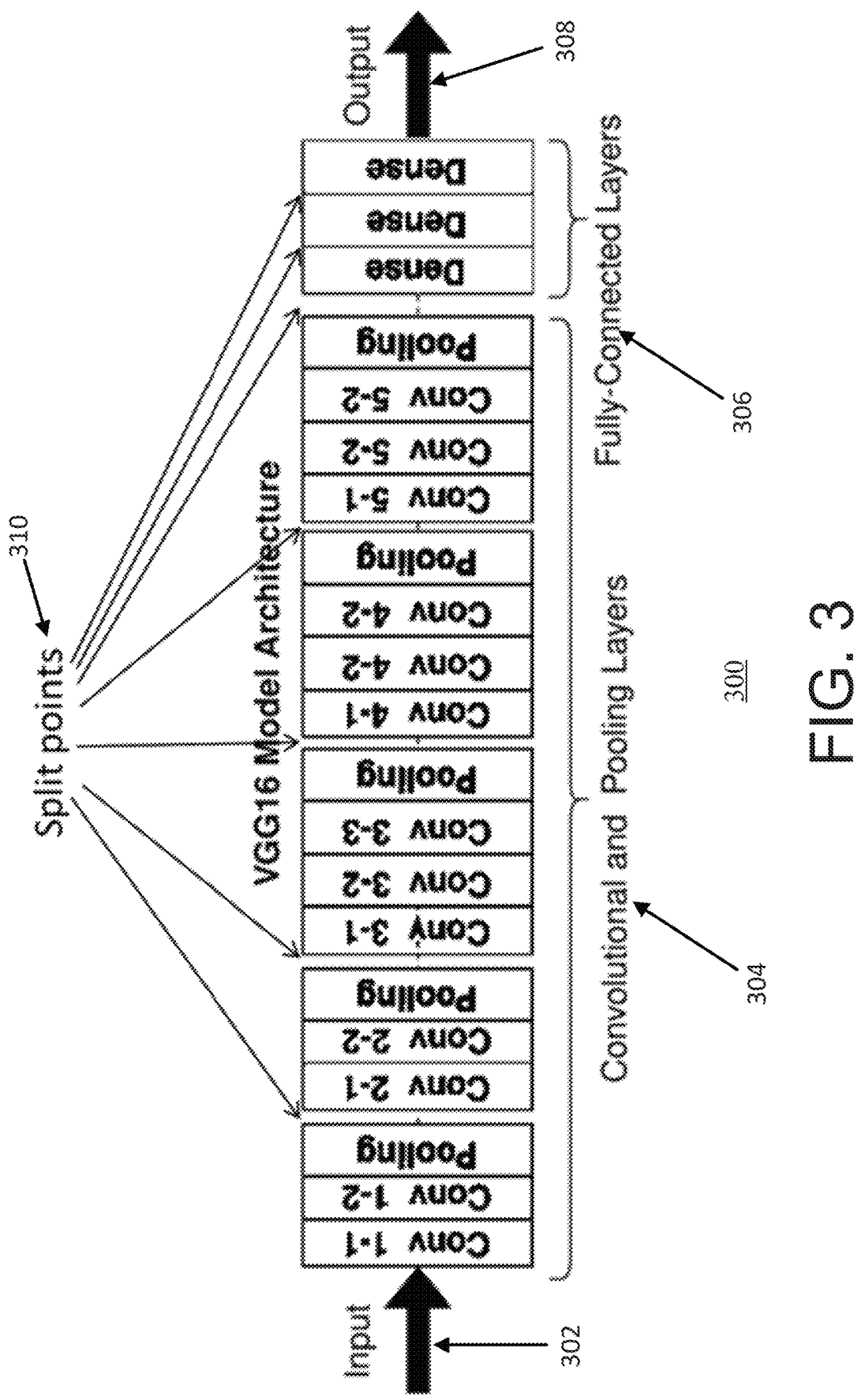
FIG. 3 schematically illustrates an example of split points for a convolutional neural network, in particular, the VGG16 model architecture.

FIG. 3 schematically illustrates an example of split points for a convolutional neural network, in particular, the VGG16 model architecture 300. For instance, the VGG 16 model architecture 300 is shown with a plurality of layers including convolutional ("Cony") layers and pooling layers ("Pooling"). Convolutional layers include a set of filters whose parameters need to be learned, and are used to extract various features form the input. Pooling layers are used to reduce the dimensions of a hidden layer (e.g., by combining outputs of neuron clusters at the previous layer into a single neuron in the next layer). Fully-Connected Layers ("Dense") include weights and biases along with the neurons and are used to connect the neurons between different layers. The VGG16 model architecture 300 shows the convolutional and pooling layers 304 and the Fully-Connected Layers 306. Further, an input 302 is provided into the VGG16 model architecture 300 and an output 308 is output from the VGG16 model architecture 300. Furthermore, split points 310 show potential split points for the VGG16. For instance, as shown, the split points 310 are after the pooling layers and after the Fully-Connected Layers 306. However, it is possible to split the NN model after any other layer. In other words, while the VGG16 model architecture 300 is shown in FIG. 3 with split points 310, in other embodiments, the NN model can be another type of NN and/or with different split points 310 (e.g., a split between the "Cony 3-1" and "Cony 3-2").

After the split is performed, the first part (closer to the input) is considered to be the "encoder" and the second part (closer to the output) is considered to be the "ML model". These two parts are retrained (e.g., by adding a new neural network and/or adding another layer for the iterative retraining). For instance, referring back to FIG. 2, the server 206 performs a split of a trained NN (e.g., the VGG16 model architecture 300) using one or more split points 310. The server 206 can determine the split points 310 based on user input and/or performing one or more methods, processes, and/or algorithms. For instance, the server 206 splits the trained NN into two parts such as a first part (e.g., "Cony 1-1" to the "Pooling" layer after "Cony 3-3") and a second part (e.g., "Cony 4-1" to the last Fully-Connected Layers 306). The part that is closer to the input 302 (e.g., the first part) is used for the PP encoder 152 and the second part is used for the PP ML model 154. For instance, after splitting the trained NN into the two parts, the server 206 retrains the two parts, which will be described below in FIGS. 4 and 5, and provides the first part (e.g., the retrained PP encoder 152) to the client device 202.

Figure 4:
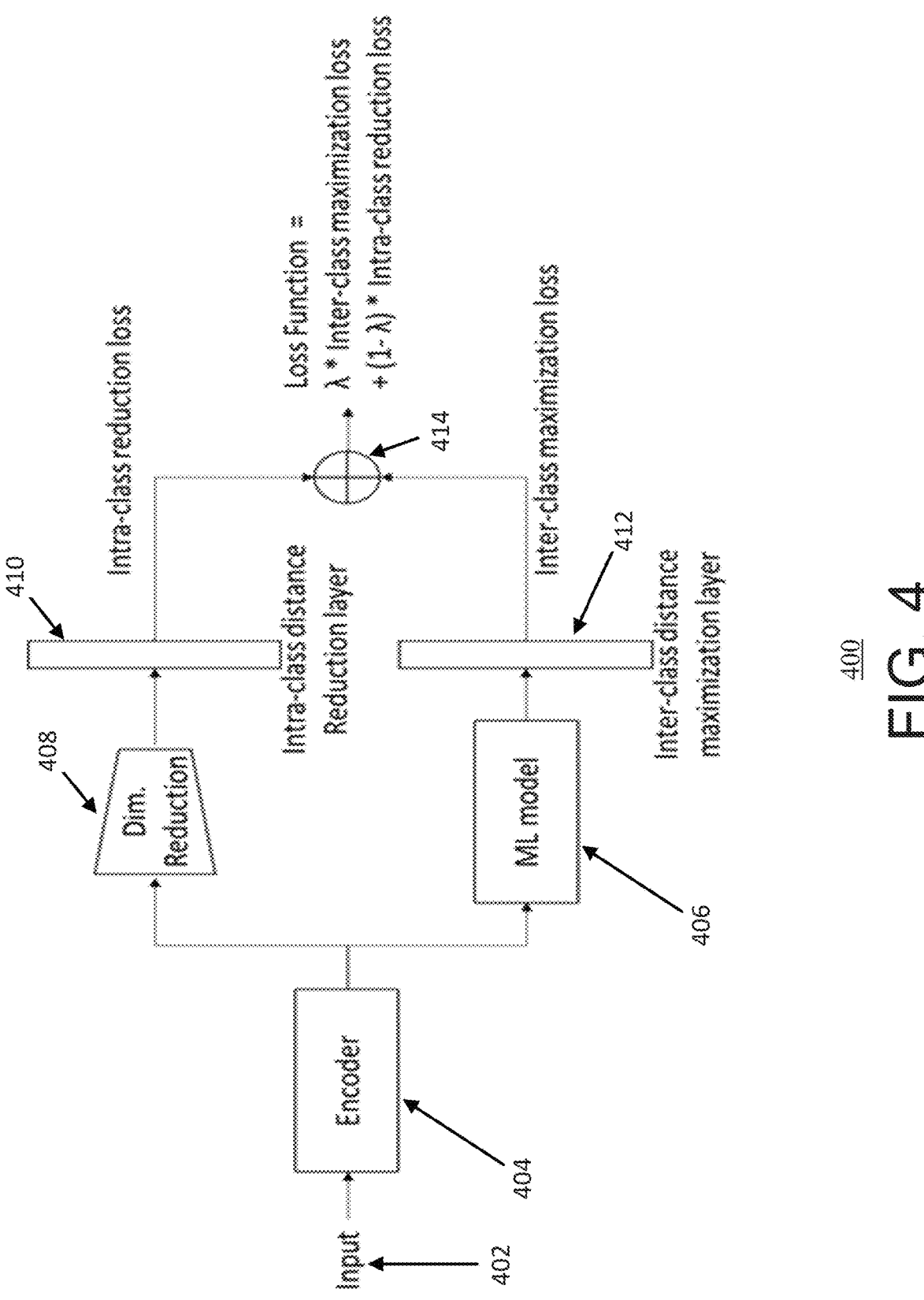
FIG. 4 illustrates a simplified block diagram depicting blocks for retraining of a privacy preservation encoder and a privacy preservation ML model.

FIG. 4 illustrates a simplified block diagram 400 depicting blocks for retraining of a privacy preservation encoder and a privacy preservation ML model. For instance, the block diagram 400 shows the architecture that is used for the retraining of the encoder 404 and the machine learning model 406. For instance, after the encoder 404, a new layer in charge of ensuring the reduction of the distance for the embedding of the same class is added (e.g., intra-class distance reduction layer 410). In some instances, the intra-class distance reduction layer 410 can be a so-called "center-loss" (see, e.g., Wen, Yandong, et al., "A discriminative feature learning approach for deep face recognition," European Conference on Computer Vision, Springer (2016), which is hereby incorporated by reference herein) that ensures that all the embedding for a single class are together close to a centroid. However, in other instances, other types of intra-class distance reduction layers can also be used by the present invention.

In some variations, the distance, even of a single class, can be affected by the high dimensionality of the inputs, resulting in poor performance. In some embodiments, the present invention addresses this technical problem and improves performance by using a dimensionality reduction method (e.g., "Dim. Reduction" 408) before the intra-class distance reduction layer 410.

For instance, the block diagram 400 shows an input 402 that is provided to an encoder 404. The input 402 is any type of input that is used to retrain the NN. The encoder 404 is the first part of the trained NN after the split is performed (e.g., the part or layers that are closer to the input) and the ML model 406 is the second part of the trained NN after the split is performed (e.g., the part or layers that are closer to the output). For instance, as mentioned above, the server 206 splits the trained NN into two parts such as a first part (e.g., "Cony 1-1" to the "Pooling" layer after "Cony 3-3") and a second part (e.g., "Cony 4-1" to the last Fully-Connected Layers 306). The encoder 404 is the first part and the ML model 406 is the second part.

After the input 402 is processed by the encoder 404 (e.g., the layers prior to the split point 310), the output is provided to the ML model 406 (e.g., the layers after the split point 310) and the dimension (Dim.) reduction block 408. The dimension reduction block 408 performs a dimension reduction method that allows the intra-class distance reduction layer 410 to perform correctly.

Afterwards, the output from the dimension reduction block 408 is provided to the intra-class distance reduction layer 410. The intra-class distance reduction layer 410 performs reduction of the distance for the embedding of the same class. For instance, this class is in charge of homogenizing the representation for all the input data belonging to the same class. As an example of image classification among dogs and cats, the intra-class distance reduction layer 410 makes the embeddings of all the cats to look similar to each other, and the embeddings of all the dogs to look similar to each other.

Furthermore, the output from the encoder 404 is processed by the ML model 406. The processed data from the ML model 406 is provided to an inter-class distance maximization layer 412. The inter-class distance maximization layer 412 is configured to make the representations of different classes as differently as possible. Following with the previous example, the inter-class distance maximization layer 412 makes the embeddings representing dogs and cats to be as different as possible.

Subsequently, the intra-class reduction loss from the intra-class distance reduction layer 410 and the inter-class maximization loss from the inter-class distance maximization layer 412 are provided to a loss function 414. These losses are then used for joint optimization for the NN. For instance, the loss function can use a lambda parameter $\lambda$(e.g., a lambda coefficient), which is a coefficient used to differentiate the contribution of the two losses to a global loss. The lambda parameter is a hyperparameter that is tuned during the training process and can be different for each use case and/or dataset. In some instances, the loss function is equal to $\lambda^*$the inter-class maximization loss from the inter-class distance maximization layer 412 plus $(1-\lambda)^*$the intra-class reduction loss from the intra-class distance reduction layer 410 (e.g., the loss function $L=\lambda^*$inter-class maximization loss$+(1-\lambda)^*$intra-class reduction loss). The loss function is used to train the NN parameters. For instance, the loss function 414 may use the outputs from the inter-class distance maximization layer 412 and the intra-class distance reduction layer 410. Further, back-propagation may be used during the training process. For instance, and in one iteration, the upper part (e.g., the Dim. Reduction block 408 and the intra-class reduction layer 410) is frozen (e.g., it is not modified). In the next iteration, the lower part (e.g., the ML model 406 and the inter-class distance maximization layer 412) is frozen. This is described in further detail below.

Figure 5A:
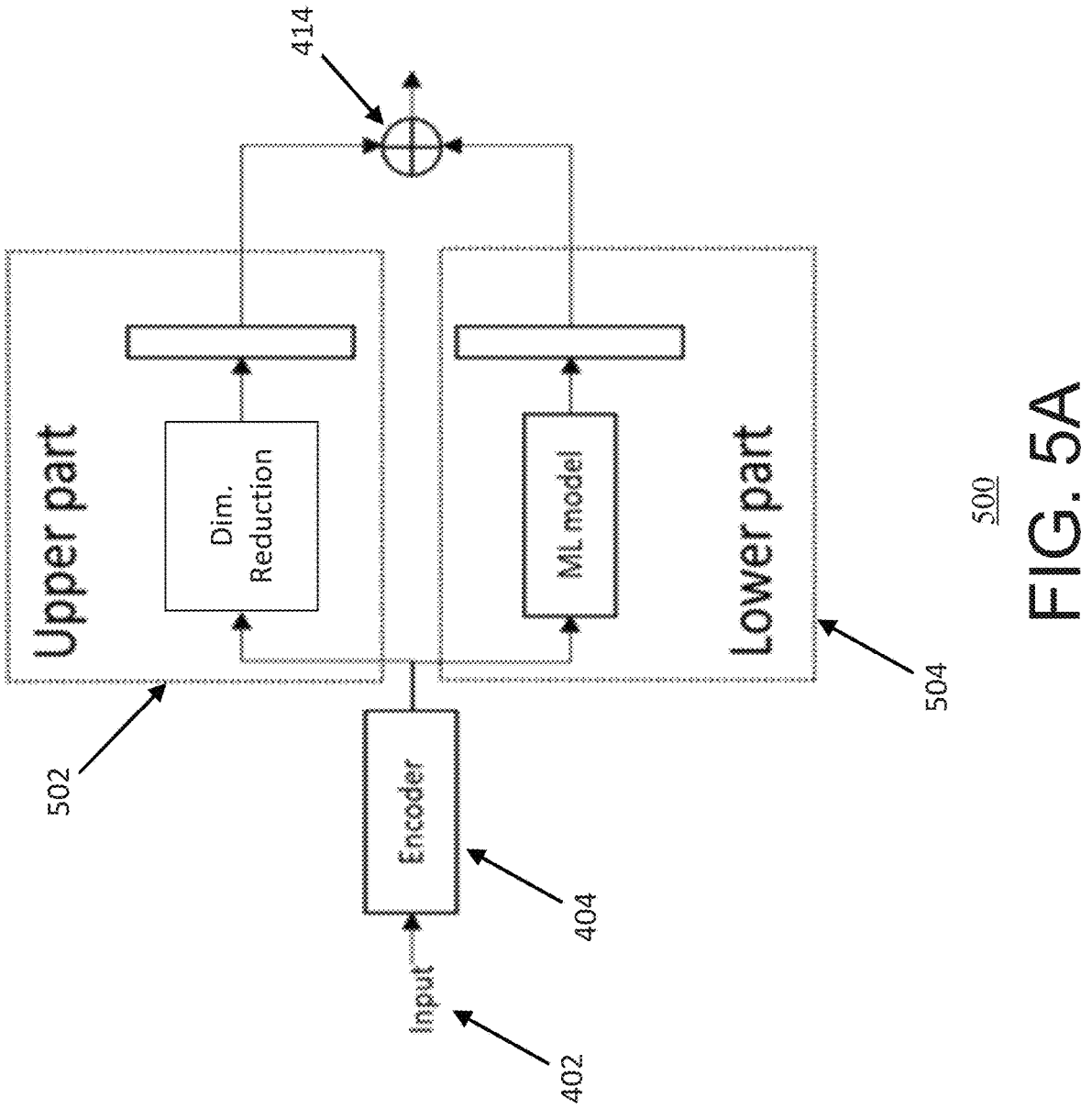
FIGS. 5A and 5B illustrate another simplified block diagram and a process for retraining of the privacy preservation encoder and the privacy preservation ML model.
Figure 5B:
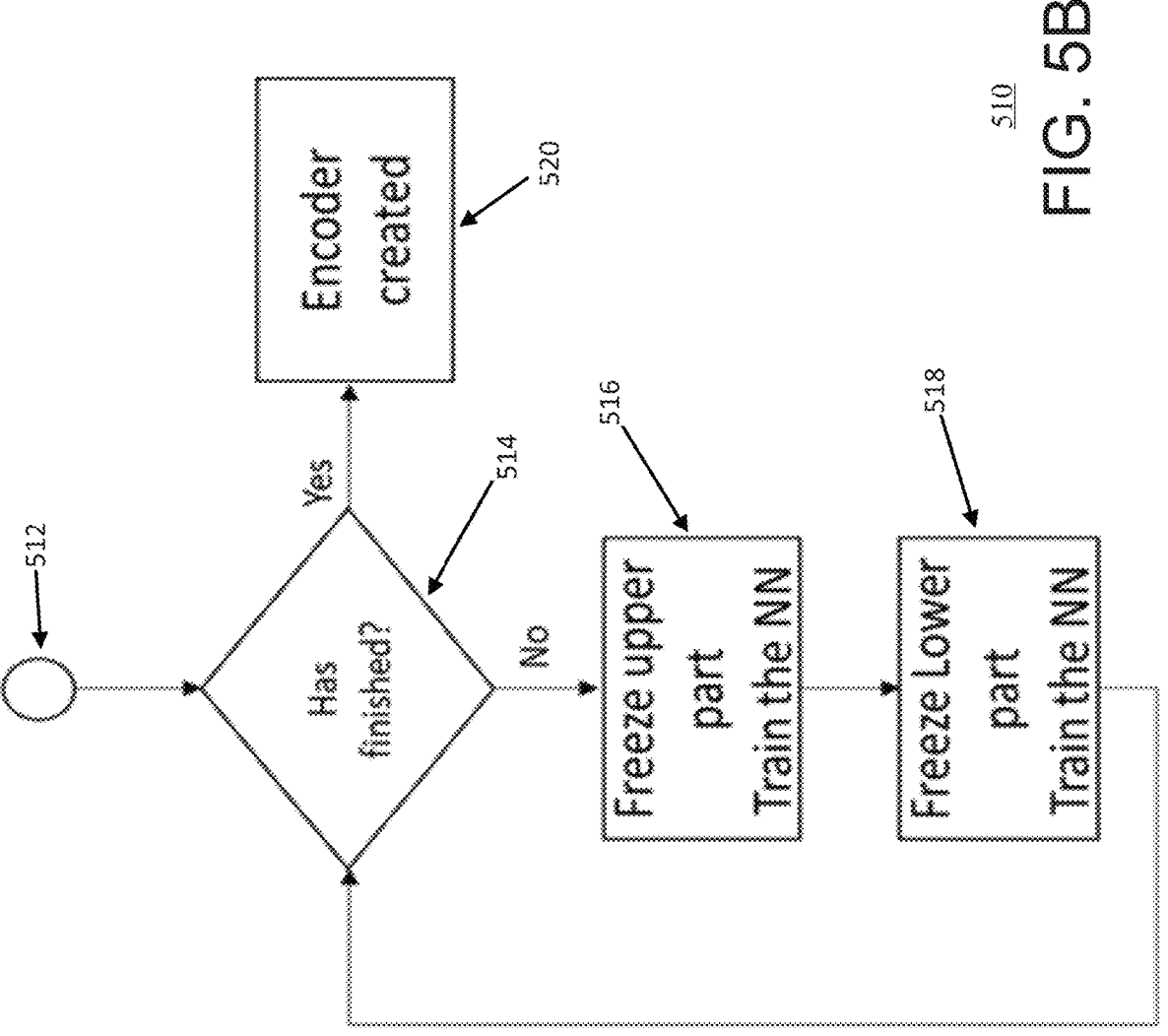

After this new structure (e.g., block diagram 400) is designed, the NN is iteratively retrained using the block diagram, which is described in FIGS. 5A and 5B. FIGS. 5A and 5B illustrate another simplified block diagram and a process for retraining of the privacy preservation encoder and the privacy preservation ML model.

For instance, FIG. 5A shows a block diagram 500, which includes the input 402, the encoder 404, and the loss function 414 that are shown in FIG. 4. Furthermore, the upper part 502 includes the Dim. Reduction block 408 and the intra-class distance reduction layer 410. The lower part 504 includes the ML model 406 and the inter-class distance maximization layer 412.

FIG. 5B shows a process 510 for using the block diagram 500 of FIG. 5A. The process 510 can be performed by the server 206 of FIG. 2. However, in other embodiments, the process 510 can be performed by another computing device or entity.

Step 512 is the start of the process 510. At step 514, the server 206 determines whether the retraining of the split NN has finished. Initially, this is a no so the process 510 moves to step 516. At step 516, the server 206 freezes the upper part of the block diagram 500 (e.g., the upper part 502), and trains the lower part 504. At step 518, the server 206 freezes the lower part of the block diagram 500 (e.g., the lower part 504), and trains the upper part 502. Afterwards, the server

206 determines whether the training has finished. If so, process 510 moves to step 520, and the server 206 creates (e.g., generates) the encoder based on the training. The created encoder (e.g., the PP encoder 152) is the encoder 404 from FIG. 5A that has been retrained using the process 500. For example, the PP encoder 152 is the encoder 404 (e.g., the first part of the layers that was split from the original trained NN) with the retrained parameters from process 500. In some instances, steps 516 and 518 are reversed (e.g., step 518 is performed first and then step 516).

For example, referring to step 516, the server 206 freezes the parameters (e.g., the weights) of the upper part 502 such as the dimension reduction block 408 and/or intra-class distance reduction layer 410. After freezing the parameters, the server 206 performs back-propagation through the lower part 504, which retrains together the encoder 404 and the machine learning model 406. For instance, the parameters of the NN (e.g., the parameters other than the hyperparameters such as the lambda parameter) can be the values of the NN that are trained during the training process. After, at step 518, the server 206 freezes the parameters (e.g., weights) of the lower part 504 such as the machine learning models 406 and/or the inter-class distance maximization layer 412. The server 206 retrains together the encoder, the dimensionality reduction block 408, and the intra-class distance layer 410. In some examples, steps 516 and 518 are reversed. For instance, step 518 can be performed before step 516.

The steps 514-518 repeat until the model converges or the level of accuracy and privacy obtained by the obtained are at acceptable levels for the machine learning task at hand. For instance, at block 514, the server 206 can check that the parameters of the neural network are not changing anymore, or it can check the accuracy and privacy levels reached after each iteration.

After the model is retrained, it may be presented to the client device 202. For instance, the server 206 determines the PP encoder 152 based on using the block diagram 400 and the process 510 (e.g., retraining the NN), the server 206 provides the PP encoder 152 to the client device 202, which can be used to create the privacy preserving data representations before they are sent to the server 206. For example, by using the block diagram 400 and the process 510, the server 206 retrains the parameters (e.g., weights) of the first part of the NN (e.g., the VGG16 model architecture 300) and the parameters (e.g., weights) of the second part of the NN. The retrained first part of the NN (e.g., the first part of the NN with the retrained parameters) is the PP encoder 152 and the retrained second part of the NN is the PP ML model 154. The server 206 provides the PP encoder 152 (e.g., the retrained first part of the NN) to the client device 202. The client device 202 uses the PP encoder 152 to determine (e.g., create or generate) privacy preserving data representations prior to sending them to the server 206.

Figure 6:
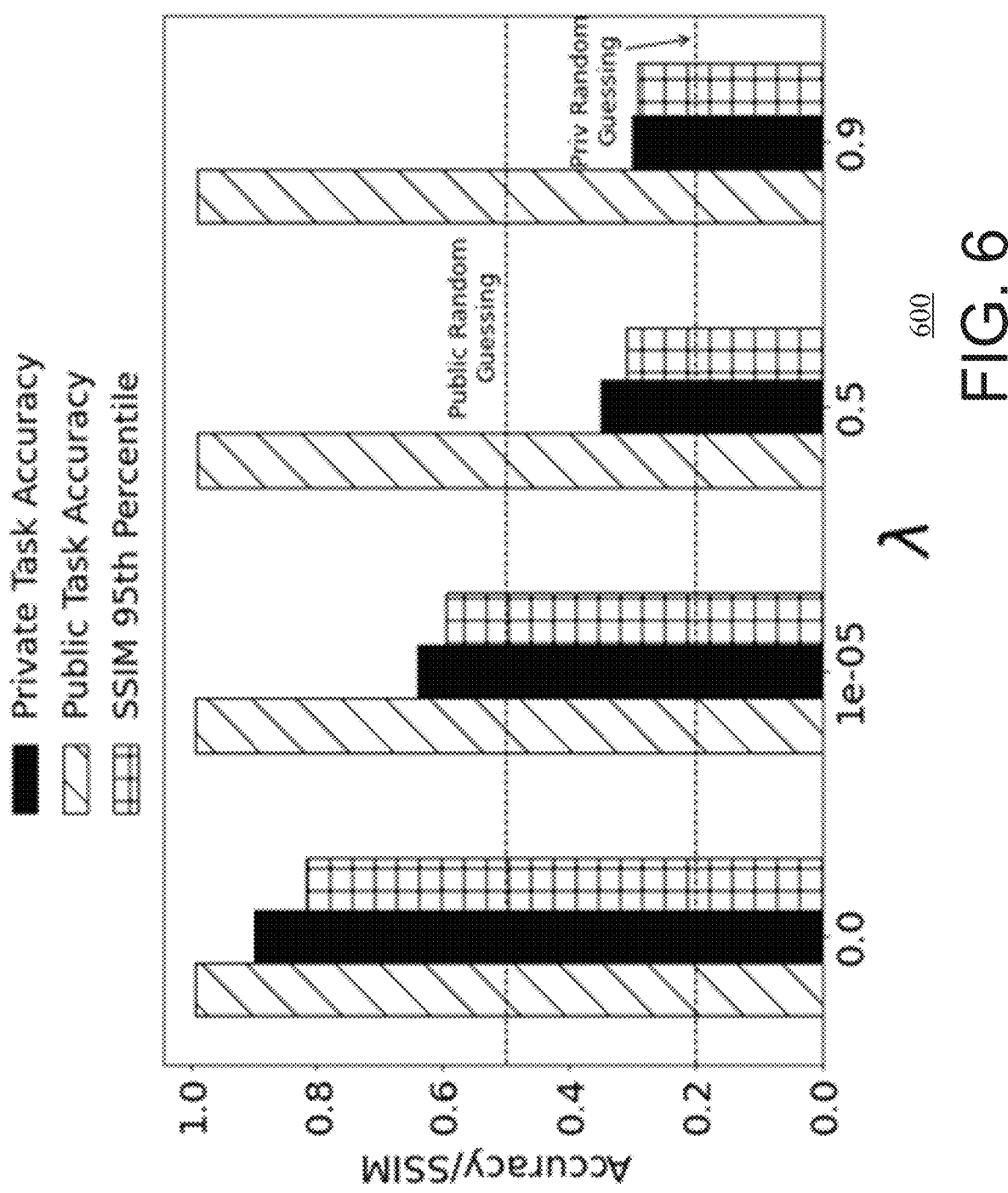
FIG. 6 graphically illustrates results using the method and system of the present invention.

Methods and systems using the present invention were performed to demonstrate the improved performance and usability of the present invention for privacy preservation. FIG. 6 graphically illustrates results using the method and system of the present invention. In particular, several uses were performed with public datasets where a public task (the task to be solved) is defined, a private task (a task to avoid to be solved) is defined, and the difference between the raw images and the images reconstructed after the PP encoder 152 is also provided. The lambda (λ) parameter is the coefficient used to differentiate the contribution of the two losses to the global loss. For instance, the 'inter-class distance' is multiplied by (lambda-1) while the 'intra-class distance' is multiplied by lambda. This is described above with the loss function. As the value of lambda grows (e.g., increasing the weight of the intra-class distance reduction), the privacy increases (e.g., less accuracy of the private task, less Structural Similarity Index (SSIM)). But, the accuracy remains high. Moreover, the results demonstrated that embodiments of the present invention can still solve the original task without privacy leaks.

For instance, FIG. 6 shows the graphical representation 600 with three types of tasks—private task accuracy, public task accuracy, and a structural similarity index measure (SSIM) $95^{th}$ percentile. A public task can be a task that the server 206 tries to solve. A private task can be a task that the server 206 is not trying to solve. For instance, a server 206 that provides gender recognition based on an image can be the public task, and facial recognition could be the private task. The SSIM $95^{th}$ percentile can be the value that is 95% of the collected data. The lambda parameter λ is shown on the x-axis and as it increases, the accuracy/SSIM decreases. The Accuracy/SSIM is shown on the y-axis for the three types of tasks. Furthermore, there are two lines within the Accuracy/SSIM for public random guessing and private (priv) random guessing. Random guessing can be choosing at random. For instance, if there are ten options, then, at random, the possibility of choosing the correct one is 10%. This can be the baseline for any prediction task (e.g., it cannot be worse than that).

Embodiments of the present invention can also be practically applied in different use cases and machine learning tasks, such as where the number of parameters are high or where a MLaaS paradigm is required, to effect further improvements in different technical fields. For example:

In an MLaaS system for image recognition, a partner (e.g., the server 206) can provide the service to different customers (e.g., different client devices 202) that send their raw images to the server 206. The existing model is retrained according to embodiments of the present invention to provide privacy to the images. That way, the customers do not need to send the raw image, but instead only a vector representation of it can be used to solve the required machine learning task. For instance, the server 206 splits a trained NN, and retrains the split NN to determine the PP encoder 152 and the PP ML model 154. The server 206 provides the PP encoder 152 to the client devices 202. The client devices 202 use the PP encoder 152 so as to not send the raw image, but instead a vector representation that is output from the PP encoder 152. The server 206 then determines an ML answer that solves the machine learning task, and provides the ML answer back to the client device 202.

In industrial predictive maintenance use cases, the factory machine provider may be serving competing customers. In such a case, customers may be reluctant to share operational data (for example data from sensors: temperature, speed, etc.) with the provider, as it may be confidential or proprietary. Using embodiments of the present invention, the different customers can share data with the provider without confidentiality issues. For instance, the server 206 splits a trained NN, and retrains the split NN to determine the PP encoder 152 and the PP ML model 154. The server 206 provides the PP encoder 152 to the client devices 202. The client devices 202 use the PP encoder 152 so as to not send the raw operational data, but instead an output from the PP encoder 152. The server 206 then determines an ML answer, and provides the ML answer back to the client device 202.

In connected vehicles, the vehicles share telemetry information with the manufacturer. But this may leak private information. Using embodiments of the present invention, the data can be privatized before it leaves the car, and still the service can be provided without impacting computational speed or accuracy. For instance, the server 206 splits a trained NN, and retrains the split NN to determine the PP encoder 152 and the PP ML model 154. The server 206 provides the PP encoder 152 to the client devices 202. The client devices 202 use the PP encoder 152 so as to not send the raw private information, but instead an output from the PP encoder 152. The server 206 then determines an ML answer, and provides the ML answer back to the client device 202.

In fraud detection, a company specialized in fraud detection may provide a service to other companies without the need of having access to raw data of the final customers. For instance, the server 206 splits a trained NN, and retrains the split NN to determine the PP encoder 152 and the PP ML model 154. The server 206 provides the PP encoder 152 to the client devices 202. The client devices 202 use the PP encoder 152 so as to not send the raw data, but instead an output from the PP encoder 152. The server 206 then determines an ML answer, and provides the ML answer back to the client device 202.

In automated or personalized healthcare, a hospital/pharmaceutical company may have trained a model with data from its own patients that may help others. For example, in the development of personalized vaccines using AI. Using embodiments of the present invention, other hospitals could query that model to create the best possible vaccine without the need of sending the raw genomics of the patient. For instance, the server 206 (e.g., the hospital/pharmaceutical company) splits a trained NN, and retrains the split NN to determine the PP encoder 152 and the PP ML model 154. The server 206 provides the PP encoder 152 to the client devices 202 (e.g., the other hospitals or pharmaceutical companies). The client devices 202 use the PP encoder 152 so as to not send the raw genomics of the patient, but instead an output from the PP encoder 152. The server 206 then determines an ML answer, and provides the ML answer back to the client device 202.

Embodiments of the present invention provide for the following improvements over existing technology:

1) Splitting a pre-trained neural network into an encoder and machine learning models and/or adding a layer that provides intra-class distance reduction.
2) Iteratively training the encoder together with either the intra-class distance reduction part and/or the machine learning model.
3) In contrast to normal MLaaS operation, allowing the operation of the service without the need of sharing raw data.
4) Providing privacy preserving machine learning services, which require significantly less computation power to obtain similar results, thereby improving performance of the computers running the machine learning models, providing for faster computation and/or conservation of computational resources, while maintaining accuracy.

According to an embodiment, the present invention provides a method for providing privacy preserving machine learning, the method comprising:

1) Splitting a neural network into two parts (e.g., a PP encoder and a PP machine learning model).

2) Applying a loss function that decreases the intra-class distance after the encoder. In some embodiments, a dimensionality reduction method is added before the loss function.
3) Retraining the encoder and the machine learning model with the new loss function (and/or also the dimensionality reduction, if done) to ensure the encoder provides privacy aggregating by losses. This training is done iteratively by freezing either the intra-class distance minimization layer or the inter-class distance maximization layer.

Embodiments of the present invention can in particular be applied to deep neural networks, and where the user having the raw data for which privacy is to be preserved has some computing power to execute part of the machine learning model (encoder part), which is provided to them. The privatization aspects also provide trust to customers in using the machine learning model.

FIG. 7 illustrates a process for privacy preservation according to an embodiment of the present disclosure. For instance, at block 702, a computing entity (e.g., the server 206) splits a trained neural network into two parts. The two parts comprise a privacy preservation encoder and a privacy preservation machine learning model. For instance, as mentioned previously, the computing entity splits a trained neural network into a first part (e.g., a first set of layers from the trained neural network) and a second part (e.g., a second set of layers from the trained neural network). The first part is closer to the input side and the second part is closer to the output side. For example, the computing entity uses a split point (e.g., a point between two of the layers of the trained neural network) to split the neural network.

At block 704, the computing entity retrains the privacy preservation encoder and the privacy preservation machine learning model. For instance, the computing entity uses one or more layers such as an intra-class distance reduction layer and an inter-class distance maximization layer to retrain the PP encoder and/or the PP machine learning model. In some embodiments, the computing entity further uses a dimension reduction process, method, or block. For instance, the dimension reduction process is provided the output from the encoder 404. The intra-class distance reduction layer is provided an output from the dimension reduction process. The PP encoder further provides an output to the PP machine learning model, which then provides an output to the inter-class distance maximization layer. Further, the computing entity uses a loss function associated with the inter-class maximization loss and an intra-class reduction loss to retrain the PP encoder and/or the PP machine learning model. In some instances, the computing entity freezes a top part (e.g., the dimension reduction block and the intra-class distance reduction layer) or a lower part (e.g., the PP machine learning model and the inter-class distance maximization layer). The computing entity then uses back-propagation on the unfrozen part to retrain the PP encoder 404 and/or the PP machine learning model.

At block 706, subsequent to the retraining, the computing entity provides the retrained privacy preserving encoder to a client device. The client device then uses the retrained PP encoder for one or more tasks. For instance, instead of providing the raw data to the computing entity (e.g., the server), the client device first inputs the raw data into the PP encoder to generate a data representation. For example, the PP encoder is part of the original NN that has been split up. The raw data is input into the retrained layers of the original NN and an output data representation is obtained. As such, the output data representation is data that has passed through layers of a NN. The client device provides the output data representation to the computing entity. The computing entity then uses the PP ML model (e.g., the second part of the original NN) to determine an ML answer. The computing entity then provides the ML answer to the client device.

Figure 8:
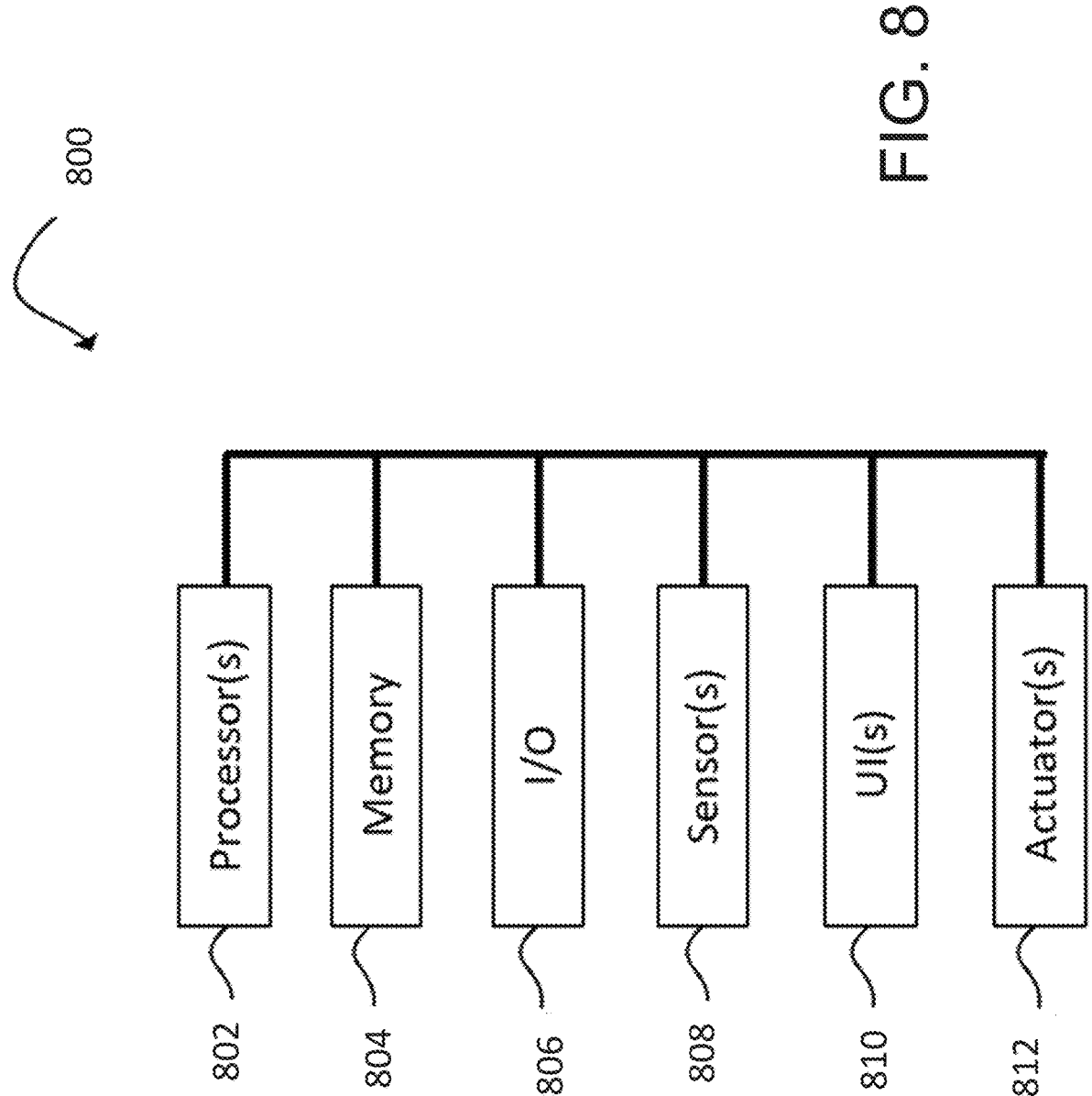
FIG. 8 illustrates a simplified block diagram depicting an exemplary computing environment according to an embodiment of the present disclosure.

FIG. 8 illustrates an exemplary processing system according to an embodiment of the present disclosure. Referring to FIG. 8, a processing system 800 can include one or more processors 802, memory 804, one or more input/output devices 806, one or more sensors 808, one or more user interfaces 810, and one or more actuators 812. Processing system 800 can be representative of each computing system disclosed herein.

Processors 802 can include one or more distinct processors, each having one or more cores. Each of the distinct processors can have the same or different structure. Processors 802 can include one or more central processing units (CPUs), one or more graphics processing units (GPUs), circuitry (e.g., application specific integrated circuits (ASICs)), digital signal processors (DSPs), and the like. Processors 802 can be mounted to a common substrate or to multiple different substrates.

Processors 802 are configured to perform a certain function, method, or operation (e.g., are configured to provide for performance of a function, method, or operation) at least when one of the one or more of the distinct processors is capable of performing operations embodying the function, method, or operation. Processors 802 can perform operations embodying the function, method, or operation by, for example, executing code (e.g., interpreting scripts) stored on memory 804 and/or trafficking data through one or more ASICs. Processors 802, and thus processing system 800, can be configured to perform, automatically, any and all functions, methods, and operations disclosed herein. Therefore, processing system 800 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 800 can be configured to perform task "X". Processing system 800 is configured to perform a function, method, or operation at least when processors 802 are configured to do the same.

Memory 804 can include volatile memory, non-volatile memory, and any other medium capable of storing data. Each of the volatile memory, non-volatile memory, and any other type of memory can include multiple different memory devices, located at multiple distinct locations and each having a different structure. Memory 804 can include remotely hosted (e.g., cloud) storage.

Examples of memory 804 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 804.

Input-output devices 806 can include any component for trafficking data such as ports, antennas (i.e., transceivers), printed conductive paths, and the like. Input-output devices 806 can enable wired communication via USB®, DisplayPort®, HDMI®, Ethernet, and the like. Input-output devices 806 can enable electronic, optical, magnetic, and holographic, communication with suitable memory 804. Input-output devices 806 can enable wireless communication via WiFi®, Bluetooth®, cellular (e.g., LTE®, CDMA®, GSM®, WiMax®, NFC®), GPS, and the like. Input-output devices 806 can include wired and/or wireless communication pathways.

Sensors 808 can capture physical measurements of environment and report the same to processors 802. User interface 810 can include displays, physical buttons, speakers, microphones, keyboards, and the like. Actuators 812 can enable processors 802 to control mechanical forces.

Processing system 800 can be distributed. For example, some components of processing system 800 can reside in a remote hosted network service (e.g., a cloud computing environment) while other components of processing system 800 can reside in a local computing system. Processing system 800 can have a modular design where certain modules include a plurality of the features/functions shown in FIG. 8. For example, I/O modules can include volatile memory and one or more processors. As another example, individual processor modules can include read-only-memory and/or local caches.

In the following, further embodiments of the present invention are described. Statements referring to the invention should be understood to be referring to one or more embodiments of the invention, and not all embodiments.

Many tasks that are commonly performed by devices attached to the Internet are currently being offloaded to the cloud, using the Machine Learning as a Service (MLaaS) paradigm. While this paradigm is motivated by the reduced capacity of mobile terminals, it also hinders privacy associated with the data exchanged over the network. Thus, the data exchanged among parties can be conveniently anonymized to prevent possible confidentiality and privacy issues. While many privacy-enhancing algorithms have been proposed in the past, they are usually relying on very complex models that make difficult their applicability to real-world systems or envision too friendly attacker models. Embodiments of the present invention uses a deep learning system that creates anonymized representations for the data, while keeping the accuracy for the targeted MLaaS task high, assuming that the attacker can retrain an adversarial model using e.g., leaked raw data. Results from using embodiments of the present invention show that i) the present invention is effective yet it uses a lighter approach than state-of-the art ii) considers less friendly attacker models, and iii) outperforms the benchmark under different privacy metrics.

The complexity and size of ML models is growing over time. Recent examples, such as GTP-3 with 175B parameters or Megatron-Turing with 530B, have presented models that are impossible to generate or even maintain for most companies in the world, not to speak about academia or users with personal devices. Moreover, it is expected similar growth in the next years. This progression, together with the slowdown in the production of new hardware severely limits the capacity of small (and even big) enterprises to use the last advances in Natural Language Processing (NLP), image recognition, or other complex ML tasks.

In this scenario, big tech companies have started to offer their models in a Machine Learning as a Service (MLaaS) fashion. That is, they run the gigantic ML models on their premises and allow customers to query the model for a pre-negotiated fare. This model is convenient for both customers that do not have the ability to create their own complex model (e.g., because they do not have a tagged dataset), and for those that need to execute (even simple) ML tasks on limited devices such as mobile phones or IoT devices.

However, to perform a MLaaS task, the customer sends the raw data (e.g., an image) to the service provider. While this operation may not present big problems in certain tasks (e.g., a connected vehicle sending telemetry data for predictive maintenance), it has heavy privacy/confidentiality implications in others (e.g., a surveillance system requesting image classification services).

Alternatively, the service provider can give the model to the customer to avoid data transfer. Nonetheless, this is typically not feasible in the case of limited devices or huge models. And even in the cases when the customer could execute the model, the MLaaS provider can have concerns as the customer could blackbox or use the model without the provider's permission.

As such, aspects of the present invention provide a technique that allows the usage of MLaaS without the privacy implications of sending raw data to third parties. In embodiments of the present invention, a previously trained model is split into two parts and then fine-tuned adding a second loss function after the first part to ensure the information after this point is only valuable to perform the task at hand, but not to perform any other task. The usage of a pre-trained model allows the easy usage of already existing models without the need of training them from scratch.

After the two parts are trained taking into account the new loss function, the first part can be sent to the customers that can execute it even with limited resources, and only transfer the obtained data representations. The rest of the model stays within the service provider ensuring that customers cannot make non-legitimate usage of the entire model from the provider.

Aspects of the present invention are able to create privacy-preserving data representations. It provides accuracy similar to the one of a neural network without privacy and, at the same time, provides higher privacy than state-of-the-art privacy solutions.

The below presents the privacy model, implementation of embodiments of the present invention for two different NN architectures and datasets and evaluate their performance. The below further shows how the model parameters affect its way of working, and a conclusion is also provided.

The application of privacy-preserving techniques to data sharing and ML has been widely studied in the past years with solutions ranging from the already classic k-anonymity, l-diversity or t-closeness to more novel solutions such as z-anonymity. Among all of them, Differential Privacy (DP) is typically the most accepted and used by the ML community.

DP grants a formal guarantee about how likely the data is to leak sensitive information, e.g., information beyond what is legitimately intended to be publicly available by the data owner. The problem to be solved in this scenario, instead, concerns "inference privacy", e.g., reducing the amount of information that is sent/published in the first place. In addition, applying DP—e.g., in the form of noise—to the data with no further tweaks usually tends to quickly degrade the whole informational content, including what should be kept usable.

Other approaches that try to preserve the privacy of exchanged data are those that employ advanced cryptographic techniques. Two particularly researched approaches today are Fully Homomorphic Encryption (FHE) and Secure Multi-Party Computation. Thanks to FHE, direct inference on encrypted data becomes possible. And, since data is never decrypted, its privacy is guaranteed. FHE usually suffers from an accuracy drop with complex networks, since it works by approximating a neural network with a low degree polynomial function. But the real major drawback is the computational cost: the encryption schemes' complexity makes the inference time increase by many orders of magnitude, making it impractical for real-time use cases. Another cryptographic approach is Secure Multi-Party Computation (SMC), which makes it possible for two entities to compute a function over their inputs while maintaining those inputs perfectly private. Usually, SMC scenarios are based on garbled circuits, secret sharing, and oblivious transfer. SMC also suffers from high cryptographic complexity. Another popular field of research concerns about how to securely run an ML model on a cloud machine. Proposals from this field rely on trusted execution environments such as INTEL SGX and ARM TRUSTZONE. Nevertheless, such scenarios still require the client to trust the cloud servers with their data.

There is another sub-field of the Privacy-Preserving research community that tries to generate privacy-preserving data representations. AutoGAN proposes a non-linear dimension reduction framework based on a generative adversarial network (GAN) structure. On it, a Generator and a Discriminator are iteratively trained in turn, in an adversarial manner, to enforce a certain distance between original and potentially reconstructed data. Another method protects the data against the execution of previously known ML tasks. Moreover, other works apply a contrastive loss to privatize the data with small differences among them on the network structure and application. Contrary to all of them, embodiments of the present invention employ the center loss in the present invention's system, allowing greatly improved privacy protection without the need of complex Siamese Networks.

Model:

Embodiments of the present invention, as a starting point, use a pre-trained neural network, then splits it into two parts and modifies it to improve the privacy provided by the final solution. In embodiments of the present invention, the computation of the inference is shared between a client, that executes the first part of the neural network (namely, the Encoder such as the PP encoder) and sends the output features to a server (e.g., in the cloud) that executes the second part (namely, the Classifier such as the PP machine learning model) and returns the ML task answer back to the client.

Figure 9:
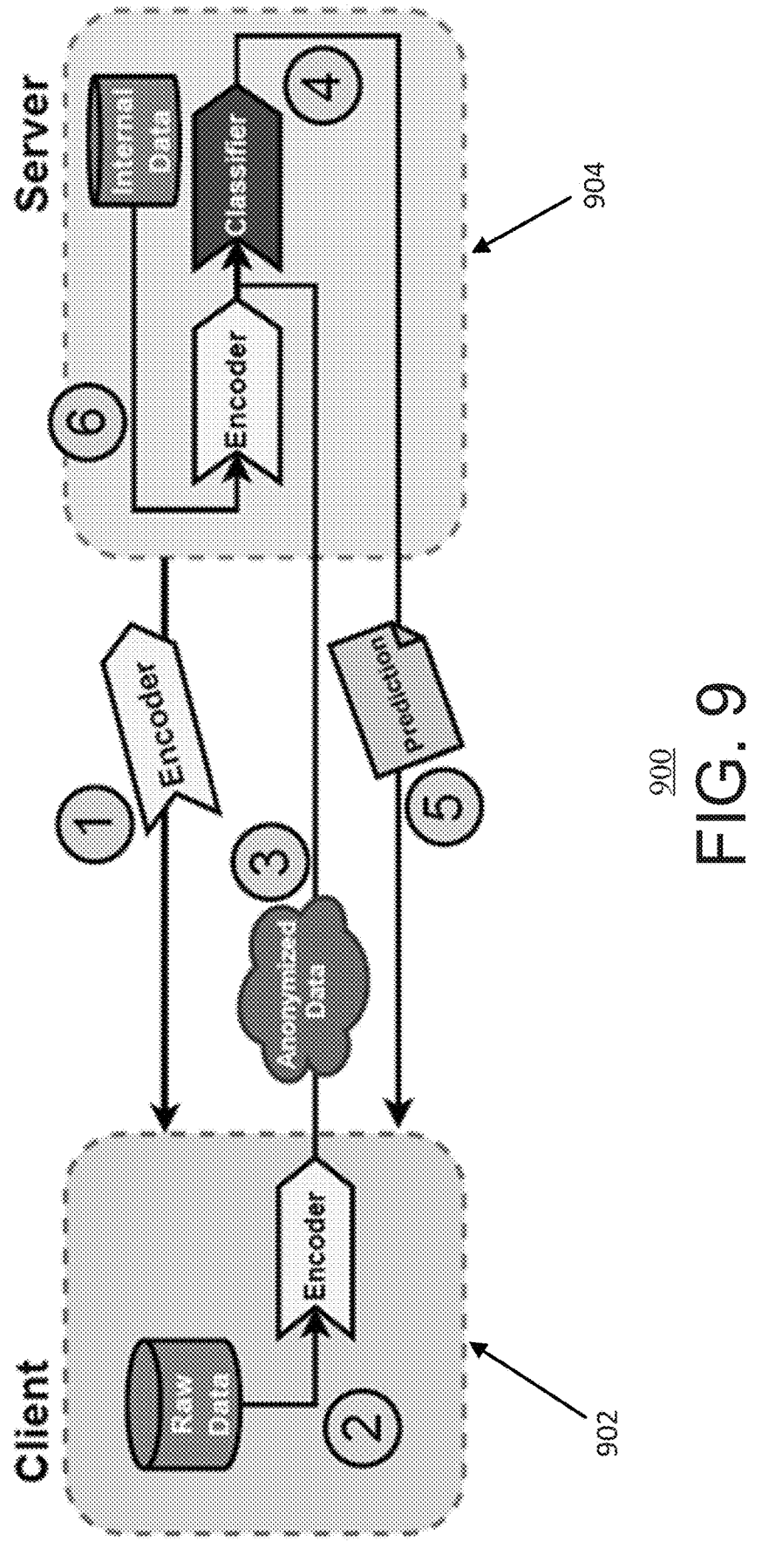
FIG. 9 schematically illustrates a method and system for providing privacy preserving machine learning according to an embodiment of the present invention.

FIG. 9 schematically illustrates a method and system for providing privacy preserving machine learning according to an embodiment of the present invention. For instance, the system 900 shows a summary of how the general model works in inference: 1) The server 904 sends an Encoder (e.g., the PP encoder) to the client 902. 2) The client 902 uses the encoder to generate anonymized representations of the raw data. 3) The client sends the anonymized data to the server 904. 4) The server 904 uses the Classifier (e.g., the PP machine learning model) to solve the ML task at hand and 5) sends the prediction to the client 902. 6) Even using the data available to the server 904, it cannot train a different Classifier to solve a different task.

The below describes how to efficiently generate an Encoder and a Classifier to maximize the accuracy for the task to be solved, without allowing the performance of other non-related tasks over the anonymized data.

Encoder and Classifier:

Embodiments of the present invention build on the intuition that features obtained in the middle of a neural network are an abstract representation of the input data and can be used to share data in a privacy-preserving way. However, without additional modifications, such features may still contain a significant amount of extra information, as demonstrated for example by the visualization techniques.

Moreover, the deeper one goes through the layers of a neural network, the more specialized, abstract and specific to the main task the features become. Furthermore, in most networks design, going deeper means also having to deal with much fewer dimensions. This all collaterally contributes to data privacy: whatever extra information was contained in the data—beyond what is actually useful to perform the main task—becomes gradually and irreversibly lost.

In the extreme case, when the network split is done after the last layer, the complete ML task would be executed by the client, obtaining that way "perfect privacy". However, this situation is not realistic in most of the use cases, either because the client cannot run the complete neural network due to hardware limitations, or because the service provider does not want to share the complete model with the client.

Thus, embodiments of the present invention generally first choose the split point that provides the client with the heaviest model it can support (and the service provider is willing to share). This alone would already grant some degree of privacy—depending on the chosen point—regarding any other extra information the data carries. Then, in addition to this—especially in cases where one is constrained to the lower levels of the network—other approaches may further enhance the privacy of the data.

Adding Privacy:

In a scenario where no knowledge about potential attacks is assumed, the only reasonable choice is to try to reduce the general amount of information contained in the data, while constraining the accuracy of the main task to be as high as possible. In a more formal way, considering the input data and their corresponding privacy-preserving representations, embodiments of the present invention reduce their Mutual Information (MI) as much as possible, while still keeping the cross-entropy loss of the whole model as low as possible. The latter is embodied in the typical softmax cross-entropy loss, computed on the output of the very last layer of the intact model: it basically keeps the points belonging to different classes well separated in the encoding space. In other words, it tries to maximize the inter-class distance.

Moreover, embodiments of the present invention also attempt to minimize the inter-class distance, to reduce any extra information contained in the structures of same-class points. Others have tried to achieve this by employing siamese network architectures and contrastive or triplet losses. The problem is these methods suffer from a non-negligible data expansion since the training set must be recombined in specific pairs. Furthermore, since these losses need pairs of points to be computed, two forward passes are needed, thus increasing the training time. That is why embodiments of the present invention choose instead to employ the Center Loss function. It is worth noting that, same as for triplet and contrastive losses, this loss was not primarily designed for privacy-preserving purposes, but to improve the discriminative power of the deeply learned features. The center loss is defined as:

$$\mathcal{L}_C = \frac{1}{2}\sum_{i=1}^{m}\|x_i - c_{y_i}\|_2^2 \qquad (1)$$

where m is the total number of classes in the dataset, $x_i$ is the i-th encoding, and $c_{y_i}$ is the center of the $y_i$ class. Hence, the term introduced by $\mathcal{L}_C$ minimizes the euclidean distance between any encoding classified to that class and the center of such class. This function is applied, combining it with the usual softmax categorical cross-entropy $\mathcal{L}_S$. The two losses are governed by a weight factor $\lambda$ as follows:

$$\mathcal{L} = \lambda\mathcal{L}_C + (1-\lambda)\mathcal{L}_S \qquad (2)$$

The above loss function is described in FIG. 4, with lambda being described above, $\mathcal{L}_C$ being the inter-class maximization loss, and $\mathcal{L}_S$ being the intra-class reduction loss.

In other words, embodiments of the present invention train the model with Joint Supervision. The variable $\lambda$ plays a fundamental role in steering the encoding anonymization process, and weights how the encodings are anonymized. First, these two terms need to be jointly optimized (so, configurations where $\lambda$ is 0 or 1, are asymptotic cases that are not necessarily meaningful in a real scenario), but $\lambda$ also has a meaning for the anonymization process. When $\lambda=0$, the model is trained to only optimize the cross-entropy among classes, as a typical classifier would do. Thus, encodings may still exhibit intra-class variations that may leak sensitive information. Basically, when $\lambda=0$, no anonymization is applied beyond what is already provided by non-linearly compressing the data—through a classifier, so in a task-based manner—into fewer dimensions. Instead, when $\lambda=1$ the encodings and the learned centers degrade to zeros (since the Center Loss is too small), yielding poor results on the machine learning task. Hence, the correct parametrization of $\lambda$ is fundamental to steering the operation of the system toward an optimal balance between accuracy and privacy.

Figure 10:
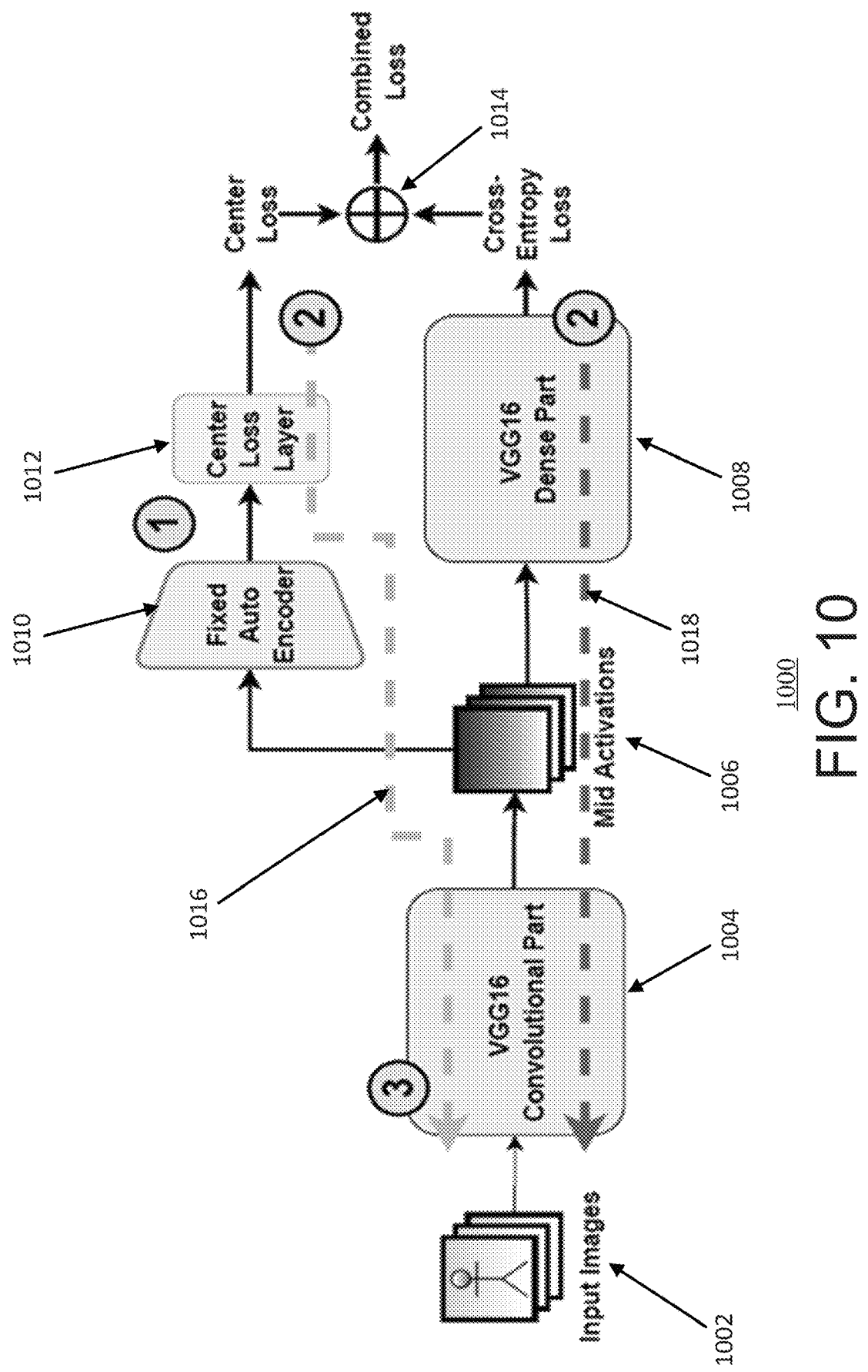
FIG. 10 schematically illustrates a model architecture according to an embodiment of the present invention.

Assuming, a pre-trained model for a 'Public Task' is obtained, and once the split point has been decided, the retraining can be performed. FIG. 10 schematically illustrates a model architecture according to an embodiment of the present invention. For instance, the model architecture 1000 includes the VGG16 convolutional part 1004 and the VGG 16 Dense Part 1008, which are part of the original NN network. The model architecture 1000 further includes the fixed auto encoder 1010, which is part of the dimensionality reduction, and a center loss (CL) layer 1012, which is a new addition that is described below. Furthermore, the model architecture 1000 includes two arrows. The first arrow 1016 shows the CL back-propagation and the second arrow 1018 shows the cross-entropy back-propagation. In particular, FIG. 10 shows an example of how the model would work when modifying the VGG16 neural network:

1. The architecture includes the input images 1002, a VGG16 convolutional part 1004, and mid activations 1006. The architecture is rearranged so that it becomes a multi-output network, with the activations 1006 of the split point going two separate ways: The natural continuation of the original network, e.g., the Dense Part 1008; the new added branch, composed of a fixed pre-trained Autoencoder 1010—for dimensionality reduction—followed by the main component of the approach, e.g., the Center Loss Layer 1012.

2. The whole network is carefully fine-tuned with a low learning rate and a Joint Supervision: During the forward pass, the CL layer 1012 "learns" new, more accurate class centroids, based on the current batch. Such centroids are then used to compute the Center Loss; the weights in the Dense part 1008 are adjusted thanks to the Cross-Entropy back-propagation, as usual; the Convolutional Part 1004, instead, is trained by the back-propagation of both losses, so that it produces features that retain both privacy and utility.

3. Once the training is finished, the first part of the network is frozen and deployed on the client side as a black-box anonymizer.

Experimental Evaluation:

The present invention is implemented to work with two or more different network architectures and datasets. Furthermore, the present invention was tested against some of the privacy metrics that are in line with the attacker model presented above, benchmarking it against the results obtained by another privacy-preserving solution: Shredder.

Datasets and Network Architecture:

Two different architectures are employed—both for image classification—to test the present invention: a LeNet-5 neural network with the MNIST dataset, for which a direct comparison with another state-of-the-art approach and a VGG16 neural network are provided, with the CelebA dataset.

The LeNet-5 network takes as input a 32×32×1 image. The channel is just one because the network is designed to use greyscale images. The architecture then consists of 5 learnable layers. The first three of these are convolutional (Cony) layers with 6, 16, and 120 filters, respectively. All three layers use a kernel size of (5,5). After the 1st and the 2nd Cony layers, a Max Pooling (MP) layer is found. Finally, the last two are Fully Connected (FC) layers. The first has 84 neurons, while the second and last FC layer has usually 10 neurons since the digits in the MNIST dataset are 10. Lastly, such a layer is usually followed by a Softmax layer that classifies the images into the corresponding classes.

The MNIST dataset used to test this case is composed of greyscale images of size 32×32 pixels, representing handwritten digits going from '0' to '9'. The training set contains 60,000 different examples of images, while the test set contains another 10,000 example images for model evaluation. The labels are simple integer numbers from 0 to 9, which indicate the specific digits in the images.

The other network in use is the well-known VGG16, a 16-layerdeep CNN (Convolutional Neural Network) primarily designed to perform image classification. In particular, the pre-trained version of VGG16 is used—trained on the huge ImageNet dataset—and first is fine-tuned for the 'public task', via transfer learning. The network consists of a first, convolutional part, and then a second, fully connected part. The first part is composed of 5 macro-blocks. Each of these blocks is a stack of 2 or 3 Convolutional layers, always followed by a Max Pooling Layer. For each block, all the cony layers have the same number of filters. From the 1st to the 5th block, one has, respectively, 64, 128, 256, 512, and 512 filters. The 2nd part of the network is simply made up of a Flatten layer followed by two Dense-Dropout blocks and the final Dense Layer. The first two Dense layers have both 4096 neurons, and both dropouts have a probability of 0.5, while the last Dense Layer has a number of neurons that depends on the number of classes of the specific task at hand.

In this case, the CelebA dataset is used. The original CelebA dataset consists of 202,599 images of celebrities' faces, of variable sizes. These images are cropped to a fixed size of 128×128×3 pixels. The images are colored, hence the three channels. The dataset comes with a huge set of labels: 10,177 identities; 5 landmark locations for each image; 40 binary attributes annotations per image. Two sets of binary labels are used: the gender and a label that indicates whether the person in the photo is smiling or not. Gender is used as the primary/public task, and purposefully choose a simple binary attribute such as smiling/not-smiling as the malicious/private task. This is done in order to prove that the approach works for hindering even such a simple task, as opposed to choosing something that would more likely be private information—and intuitively more difficult to leak—such as identity.

Privacy Metrics:

Mutual information (MI) is an information-theoretic notion. Assuming two data points x and y, MI(x, y) quantifies the average amount of information that leaks (e.g., is learnable) from y about x. This measure is commonly employed in literature, both as an anonymity metric when dealing with database potential leakage and to better explain the behavior of neural networks. In the present experiments, the Mutual Information Drop experienced when comparing the MI between raw data and simple mid-network features (no enhanced privacy) with the MI between raw data and the data representations obtained after the encoder is calculated.

Moreover, since the encoder is public (to all possible clients, and the server itself), a malicious entity can try to retrain a Classifier in order to solve a different task than the one requested by the Client. Thus, the normalized Private Task Accuracy Drop of an adversary classifier is computed. That is, how worse the privacy task results are when trained on deep features or data representations, with respect to a typical classifier free to train the private task on the raw input data.

Proving that the chosen 'sensitive' task fails does not guarantee that any other potentially sensitive information is safe, of course. Hence, testing how well a full decoder can be trained on some leaked data is also performed, in order to reconstruct the original input images from the data representations. Intuitively, if the reconstructed images are too similar to the original ones, it means that the extra information contained in the image may potentially leak from the data representations obtained. Not only a visual comparison for such similarity are provided but also a quantitative measure, in the form of the Structural Similarity Index Measure (SSIM), a metric specifically designed to mimic human perception of 'image similarity'. In its simplest form, SSIM is represented by a number between −1 and 1 usually rescaled between 0 and 1—where −1 means "completely different" and 1 means "exactly the same".

The architectures of the adversary classifier and decoder are the following:

For the classifier, what remains of the VGG16 or the LeNet-5 network after the chosen split point is taken, and it is retrained with the private labels and the anonymized data representations of a holdout set.

For the decoder, a simple custom upsampling network is employed for the LeNet-5/MNIST case and the AlexNet decoder for the VGG16/CelebA case. It is trained with a holdout set of anonymized data representations, and their original counterparts as labels.

TABLE 1

| | | Normalized Public Task Accuracy (%) | Private Task Accuracy Drop (%) | Mutual Info Drop (1%) | 95$^{th}$ Percentile SSIM Drop (%) |
|---|---|---|---|---|---|
| Dataset | Algorithm | | | | |
| MNIST | NoPrivacy/DeepFeatures | 100.0 | 00.36 | N/A | 10.19 |
| | Shredder | 98.93 | 23.98 (1.17$^2$) | 66.97 | 91.34 (75.57$^2$) |
| | Present Invention (Scrunch) | 99.34 | 60.56 | 79.66 | 81.75 |
| CelebA | NoPrivacy/DeepFeatures | 100.0 | 29.86 | N/A | 39.94 |
| | Present Invention (Scrunch) | 99.73 | 40.02 | 5.76 | 70.8 |

Table 1 shows the obtained privacy results against the metrics introduced above. Higher values mean better performances, in all columns. The public accuracy is normalized by the accuracy that the models reach in absence of any privacy-preserving approach, for their public tasks. The private accuracy loss is computed with respect to the accuracy that a full, free model would obtain by training with the private labels. Two popular datasets, MNIST and CelebA, are tested using LeNet-5 and VGG16 respectively as the backbone network for the classification tasks. For the training of the encoder, the original dataset is split into Training, Validation, and Test with a 40%, 40%, 20% proportion for both the solutions. When training the adversary attacker classifiers, a similar split is used. For Scrunch, the best results are obtained with $\lambda=0.9$, with a learning rate of $10^{-5}$. The adversary classifiers and decoders are trained with learning rates of $10^{-5}$ and $10^{-3}$, respectively. Shredder is configured as described above.

Results show that for both the datasets, Scrunch can basically retain all the accuracy on the public task as if there was no privacy solution applied, with a drop that is below 1% for MNIST and 0.26% for CelebA. Also, Shredder is on par with these results. However, Scrunch proves to be much more powerful in dropping the accuracy in the private tasks than Shredder. For the MNIST case, where both implementations can be compared, the privacy drop obtained by Shredder is more than doubled, approximating the performance of a random guesser.

This is also partially explained by the loss in the mutual information (13% higher in Scrunch), which quantifies the amount of information—about the original data points—that leaks from the data representations. Similar considerations apply also to the CelebA dataset. Here, the accuracy on the private task can be dropped, while the mutual information is less affected due to the high dimensionality of the input raw data.

It is fundamental to remark here that, besides obtaining better privacy metrics than a state-of-the-art solution, Scrunch does that while enforcing a much more stringent privacy scenario. While Shredder does not retrain the adversarial attacker on possibly similar data with available labels (an aspect that is more appropriate in many cyber-attack scenarios), in embodiments of the present invention, the adversary can re-train on leaked data, to improve the effectiveness of the attack. Still, even in this extremely challenging scenario, better results can be obtained than Shredder for MNIST and a significant decrease in the accuracy for the private task for CelebA.

Figure 11:
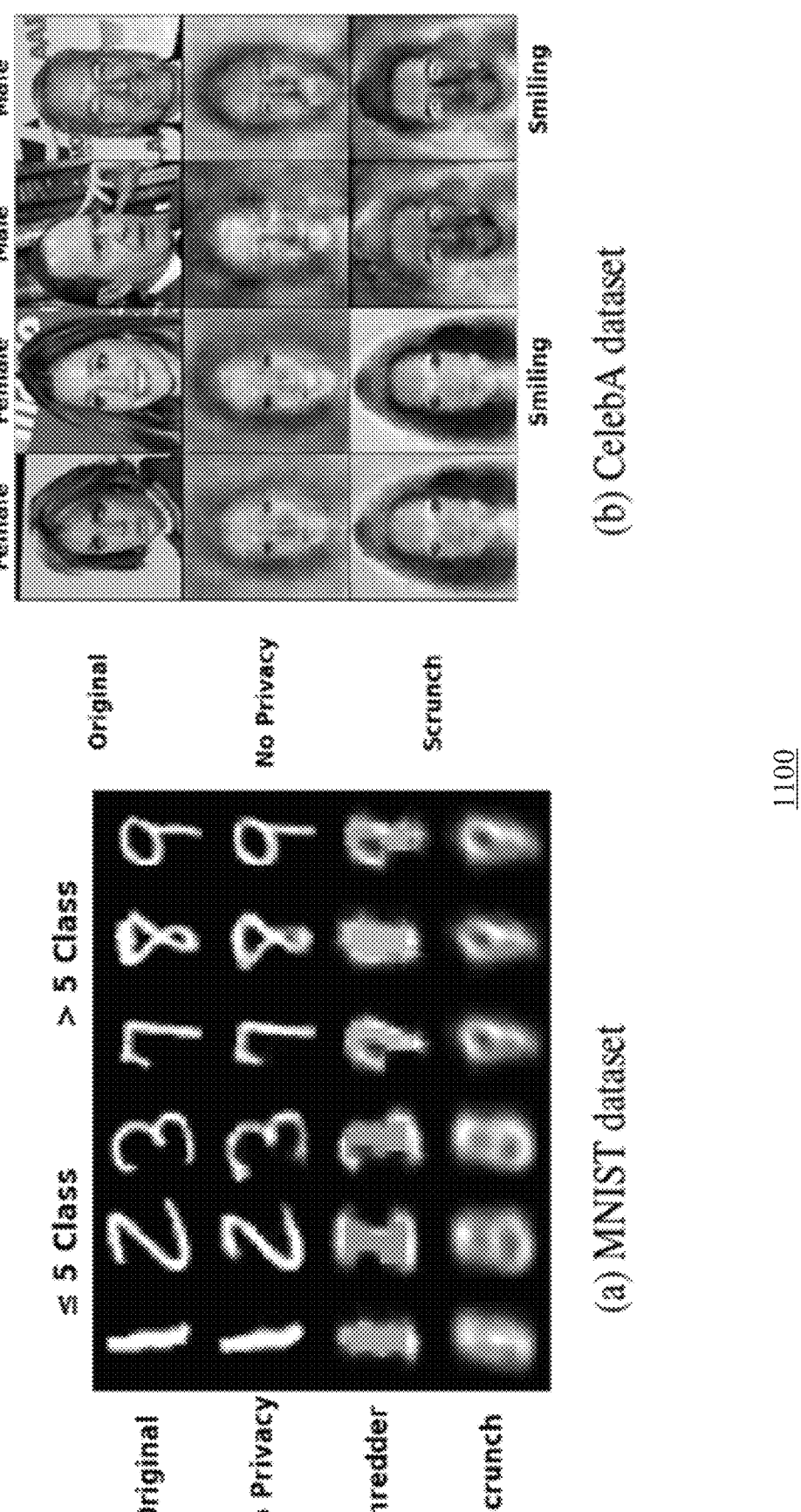
FIG. 11 illustrates example images reconstructed from the data representations.

FIG. 11 illustrates example images reconstructed from the data representations. For instance, FIG. 11 provides an overview of the visual reconstructions. Without privacy, the raw data can be reconstructed in a more or less straightforward way from the decoders, depending on the network complexity and the chosen split point. Particular mention should go to the VGG16/CelebA case (right image): while the simple embedding—e.g., with no privacy—are unmistakably much less recognizable than their original counterparts, it is still possible, even for a human observer, to differentiate sensitive features (e.g. whether the person is smiling). Such a sensitive feature is then lost when Scrunch is applied, leaving the public task the only one feasible. The left image provides a quick intuition of how Scrunch works with respect to Shredder and other naive solutions. Scrunch "learns" how to blend together samples from the same public classes, making them indistinguishable from the private ones. Shredder, instead, works by learning "where to add noise" on each sample, a technique that proved to be less resilient in the benchmarks.

Figure 12:
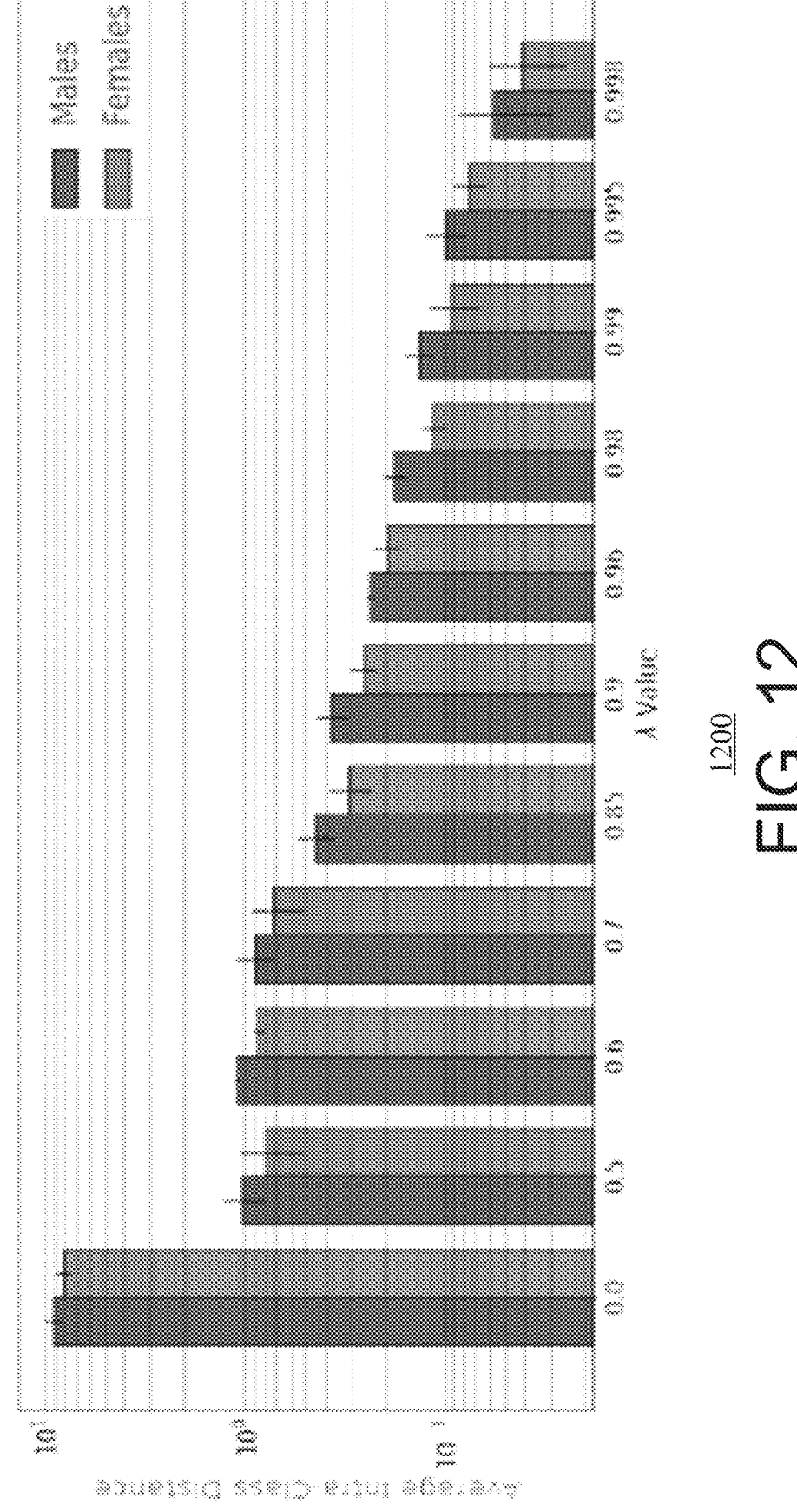
FIGS. 12-14 graphically illustrate results of experiments demonstrating performance of the method and system according to an embodiment of the present invention.
Figure 13:
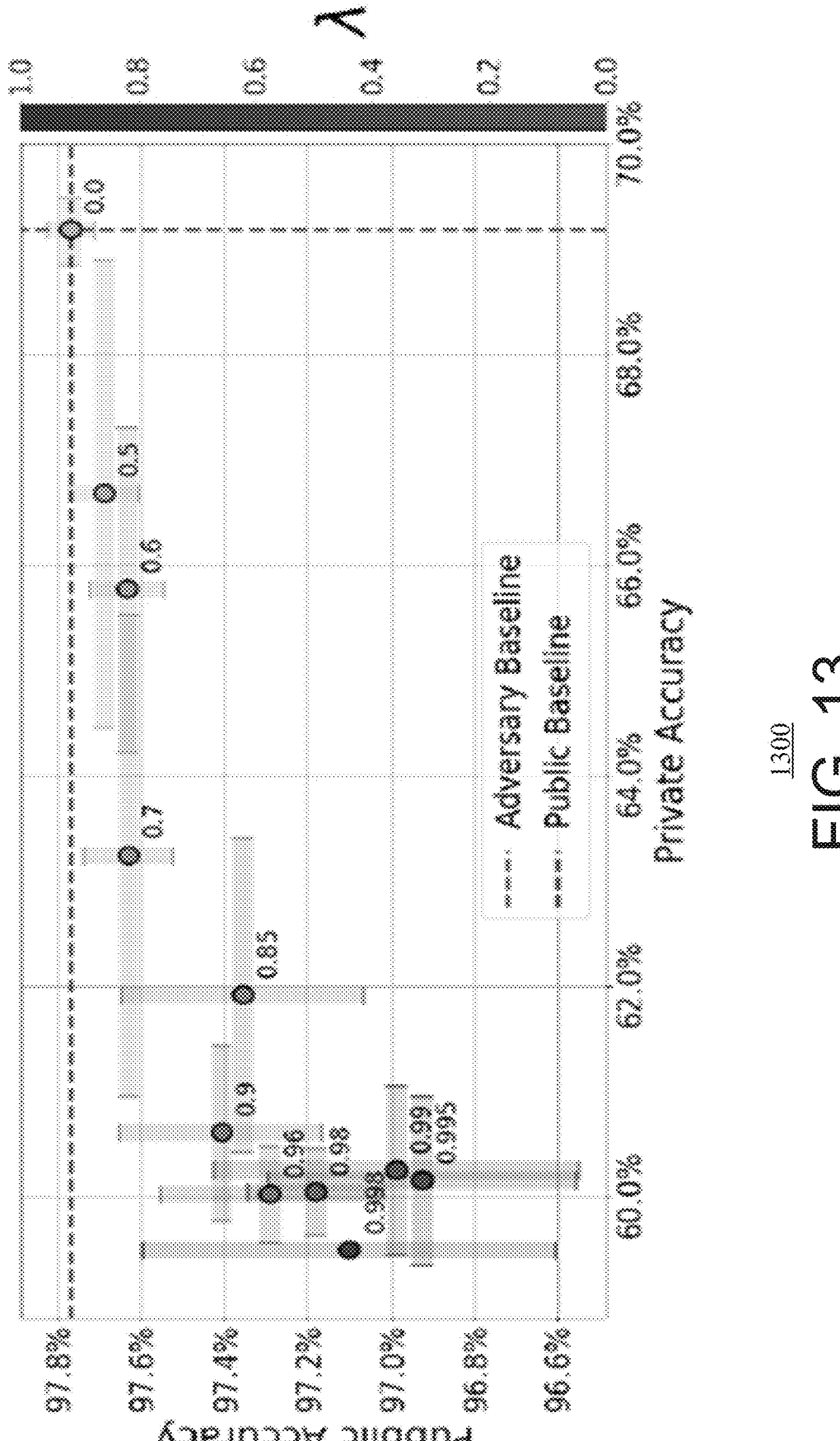
Figure 14:
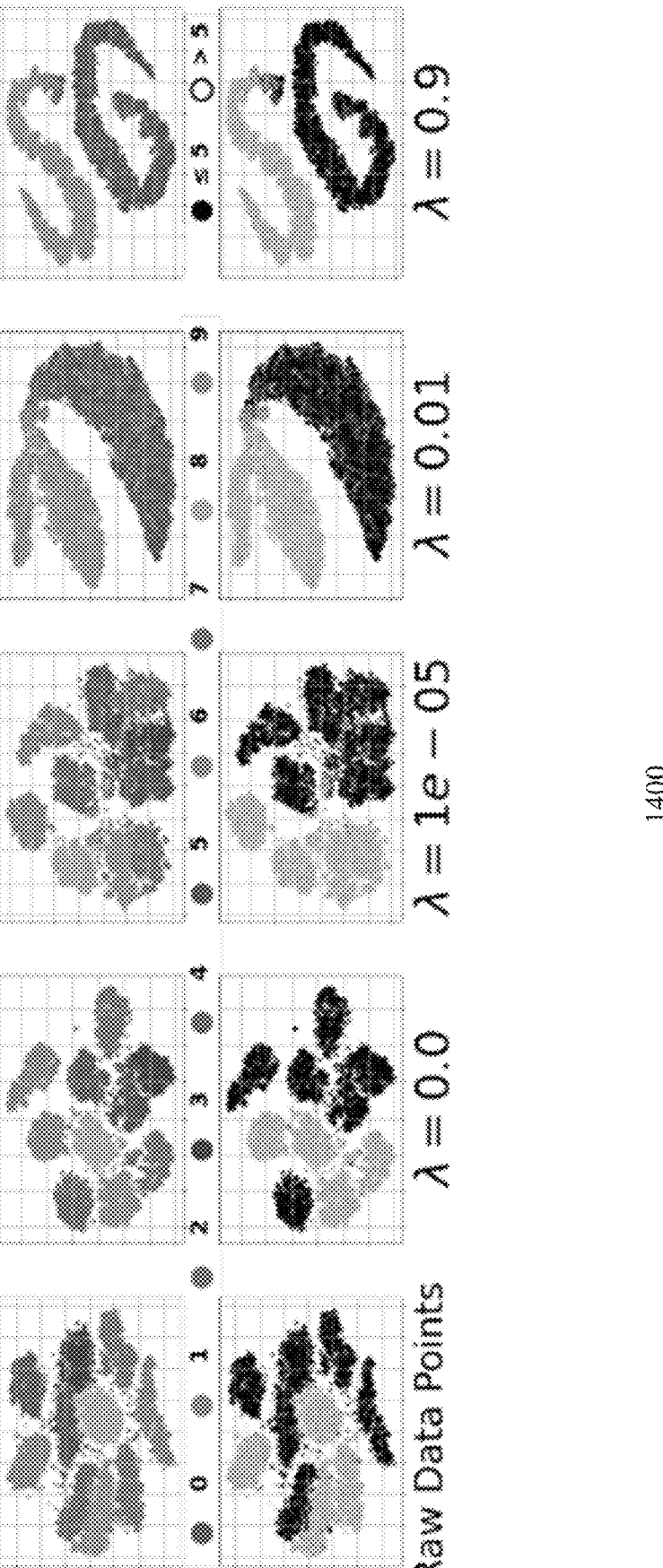

Parametrization:

FIGS. 12-14 graphically illustrate results of experiments demonstrating performance of the method and system according to an embodiment of the present invention with different parameters. For instance, as discussed above, the present invention can be steered through the configuration of k, and discussed above are results with the best k. Here, the effect of $\lambda$ to steer the operation of the system is discussed, using the datasets introduced above.

In embodiments of the present invention, $\lambda$ is used to weight the categorical cross entropy and the center loss. FIG. 12 depicts the intra-cluster distance for the two public categories of the CelebA dataset. FIG. 12 depicts the intra-cluster distance for the two public categories of the CelebA dataset. If the results for $\lambda=0$ are referenced, increasing it allows for reducing the intra-cluster distance by order of magnitudes. By reducing the intra-cluster distance, using the same data for tasks other than the public one results in a lowered accuracy, as discussed earlier.

The result by analyzing how $\lambda$ affects the utility versus privacy trade-off is further dug into, and that is how the data transformation for privacy purposes affects the accuracy of the public task. This is depicted in FIG. 13, indicating the confidence interval in the accuracy averaged over 10 repetitions for the CelebA dataset. The Adversary baseline is the vertical dotted line and the public baseline is the horizontal dotted line. It can clearly be seen to observe two areas: the first for higher $\lambda$ that yields higher privacy at a cost of lower public accuracy. The public accuracy plateaus instead in the second region, where decreasing $\lambda$ does not help the public accuracy, while it quickly increases the private one. Thus, by changing k, this trade-off can be effectively controlled.

Another way of assessing how the inter-class distance is reduced by lambda is by plotting the 2-D embedding using t-SNE for different λ values. This is depicted in FIG. 14 for the MNIST dataset, where the upper row is colored to represent the clusters for the private task and the bottom row is representing the public one. While there is a clear separation for lower λ for both public and private clusters, the effect of a growing λ blends points belonging to the same public cluster but different private ones, achieving thus a drastic drop in accuracy for the private tasks shown in Table 1.

DISCUSSION

The present invention presents Scrunch, an ML technique to learn privacy preserving data representations of data that can be used in MLaaS scenarios. In Scrunch, the client locally executes an encoder over the raw data and only shares the privatized data representations with the MLaaS Server, ensuring that way that the server (or other malicious entities) cannot use the data to perform any task different than the one requested by the Client.

In Scrunch, the encoder used by the client, and the classifier used by the server are generated by splitting an already trained neural network, modifying it by adding a new layer that ensures the intra-class distance minimization (e.g., the center loss) and retraining the whole model using joint-supervision.

Scrunch has demonstrated to provide much better privacy than state-of-the-art solutions (38% and 13% in Private Task Accuracy Drop and Mutual Information Drop, respectively) while keeping the accuracy for the public task virtually unaffected in spite of ensuring a much more realistic privacy model. Finally, it is shown that Scrunch can be parameterized to steer its operation, for instance by trading privacy for accuracy and reducing the training time.

The following list of references are hereby incorporated by reference herein:

Joppe W Bos, Kristin Lauter, Jake Loftus, and Michael Naehrig. Improved security for a ring-based fully homomorphic encryption scheme. In IMA International Conference on Cryptography and Coding, pp. 45-64. Springer, 2013.

Paul Cuff and Lanqing Yu. Differential privacy as a mutual information constraint. In Proceedings of the 2016 ACM SIGSAC Conference on Computer and Communications Security, pp. 43-54, 2016.

Jia Deng, Wei Dong, Richard Socher, Li-Jia Li, Kai Li, and Li Fei-Fei. Imagenet: A large-scale hierarchical image database. In 2009 IEEE Conference on Computer Vision and Pattern Recognition, pp. 248-255, 2009. doi: 10.1109/CVPR.2009.5206848.

Alexey Dosovitskiy and Thomas Brox. Inverting visual representations with convolutional networks. In Proceedings of the IEEE conference on computer vision and pattern recognition, pp. 4829-4837, 2016.

Cynthia Dwork, Frank McSherry, Kobbi Nissim, and Adam Smith. Calibrating noise to sensitivity in private data analysis. In Shai Halevi and Tal Rabin (eds.), Theory of Cryptography, pp. 265-284, Berlin, Heidelberg, 3 2006. Springer Berlin Heidelberg.

William Fedus, Barret Zoph, and Noam Shazeer. Switch transformers: Scaling to trillion parameter models with simple and efficient sparsity, 2021.

Craig Gentry. Fully homomorphic encryption using ideal lattices. In Proceedings of the forty-first annual ACM symposium on Theory of computing, pp. 169-178, 2009.

Ran Gilad-Bachrach, Nathan Dowlin, Kim Laine, Kristin Lauter, Michael Naehrig, and John Wernsing. Cryptonets: Applying neural networks to encrypted data with high throughput and accuracy. In International conference on machine learning, pp. 201-210. PMLR, 2016.

Lucjan Hanzlik, Yang Zhang, Kathrin Grosse, Ahmed Salem, Maximilian Augustin, Michael Backes, and Mario Fritz. Mlcapsule: Guarded offline deployment of machine learning as a service. In Proceedings of the IEEE/CVF Conference on Computer Vision and Pattern Recognition, pp. 3300-3309, 2021.

N. Jha, T. Favale, L. Vassio, M. Trevisan, and M. Mellia. z-anonymity: Zero-delay anonymization for data streams. In 2020 IEEE International Conference on Big Data (Big Data), pp. 3996-4005, Los Alamitos, CA, USA, dec 2020. IEEE Computer Society. doi: 10.1109/Big-Data50022.2020.9378422.

Kousha Kalantari, Lalitha Sankar, and Oliver Kosut. On information-theoretic privacy with general distortion cost functions. In 2017 IEEE International Symposium on Information Theory (ISIT), pp. 2865-2869. IEEE, 2017.

Yann LeCun and Corinna Cortes. MNIST handwritten digit database. 2010. URL http://yann.lecun.com/exdb/mnist/.

N. Li, T. Li, and S. Venkatasubramanian. t-closeness: Privacy beyond k-anonymity and l-diversity. In 2007 IEEE 23rd International Conference on Data Engineering, pp. 106-115, 2007.

Jiachun Liao, Oliver Kosut, Lalitha Sankar, and Fl'avio P Calmon. A general framework for information leakage, 2017.

Jian Liu, Mika Juuti, Yao Lu, and Nadarajah Asokan. Oblivious neural network predictions via minion transformations. In Proceedings of the 2017 ACM SIGSAC conference on computer and communications security, pp. 619-631, 2017.

Ziwei Liu, Ping Luo, Xiaogang Wang, and Xiaoou Tang. Deep learning face attributes in the wild. In Proceedings of International Conference on Computer Vision (ICCV), December 2015.

Ashwin Machanavajjhala, Daniel Kifer, Johannes Gehrke, and Muthuramakrishnan Venkitasubramaniam. l-diversity: Privacy beyond k-anonymity. ACM Trans. Knowl. Discov. Data, 1(1):3—es, March 2007. ISSN 1556-4681. doi: 10.1145/1217299.1217302.

Mohammad Malekzadeh, Richard G Clegg, and Hamed Haddadi. Replacement autoencoder: A privacy-preserving algorithm for sensory data analysis. In 2018 IEEE/ACM Third International Conference on Internet-of-Things Design and Implementation (IoTDI), pp. 165-176. IEEE, 2018.

Fatemehsadat Mireshghallah, Mohammadkazem Taram, Ali Jalali, Ahmed Taha Elthakeb, Dean Tullsen, and Hadi Esmaeilzadeh. A principled approach to learning stochastic representations for privacy in deep neural inference. arXiv preprint arXiv:2003.12154, 2020a.

Fatemehsadat Mireshghallah, Mohammadkazem Taram, Prakash Ramrakhyani, Ali Jalali, Dean Tullsen, and Hadi Esmaeilzadeh. Shredder: Learning noise distributions to protect inference privacy. In Proceedings of the Twenty-Fifth International Conference on Architectural Support for Programming Languages and Operating Systems, pp. 3-18, 2020b.

Payman Mohassel and Yupeng Zhang. Secureml: A system for scalable privacy-preserving machine learning. In 2017 IEEE symposium on security and privacy (SP), pp. 19-38. IEEE, 2017.

Hung Nguyen, Di Zhuang, Pei-Yuan Wu, and Morris Chang. Autogan-based dimension reduction for privacy preservation. Neurocomputing, 384:94-103, 2020.

Nvidia. Using deepspeed and megatron to train megatron-turing nlg 530b, the world's largest and most powerful generative language model. https://developer.nvidia.com/blog/using-deep speed-and-megatron-to-train-megatron-turing-nlg-530b-the-worlds-largest-2022 (accessed Sep. 28, 2022).

OpenAI. Openai unveils 175 billion parameter gpt-3 language model. https://synced.medium.com/openai-unveils-175-billion-parameter-gpt-3-language-model-3d3f453124cd, 2022 (accessed Sep. 28, 2022).

Seyed Ali Osia, Ali Shahin Shamsabadi, Ali Taheri, Kleomenis Katevas, Hamid R Rabiee, Nicholas D Lane, and Hamed Haddadi. Privacy-preserving deep inference for rich user data on the cloud. arXiv preprint arXiv:1710.01727, 2017.

Seyed Ali Osia, Ali Taheri, Ali Shahin Shamsabadi, Kleomenis Katevas, Hamed Haddadi, and Hamid R Rabiee. Deep private-feature extraction. IEEE Transactions on Knowledge and Data Engineering, 32(1):54-66, 2018.

Seyed Ali Osia, Ali Shahin Shamsabadi, Sina Sajadmanesh, Ali Taheri, Kleomenis Katevas, Hamid R Rabiee, Nicholas D Lane, and Hamed Haddadi. A hybrid deep learning architecture for privacy-preserving mobile analytics. IEEE Internet of Things Journal, 7(5):4505-4518, 2020.

Andrew M Saxe, Yamini Bansal, Joel Dapello, Madhu Advani, Artemy Kolchinsky, Brendan D Tracey, and David D Cox. On the information bottleneck theory of deep learning. Journal of Statistical Mechanics: Theory and Experiment, 2019(12):124020, 2019.

Florian Schroff, Dmitry Kalenichenko, and James Philbin. Facenet: A unified embedding for face recognition and clustering. In Proceedings of the IEEE conference on computer vision and pattern recognition, pp. 815-823, 2015.

Karen Simonyan and Andrew Zisserman. Very deep convolutional networks for large-scale image recognition. arXiv preprint arXiv:1409.1556, 2014.

Yi Sun, Yuheng Chen, Xiaogang Wang, and Xiaoou Tang. Deep learning face representation by joint identification-verification. Advances in neural information processing systems, 27, 2014.

Latanya Sweeney. K-anonymity: A model for protecting privacy. Int. J. Uncertain. Fuzziness Knowl.-Based Syst., 10(5):557-570, October 2002. ISSN 0218-4885. doi: 10.1142/S0218488502001648.

Florian Tramer and Dan Boneh. Slalom: Fast, verifiable and private execution of neural networks in trusted hardware. arXiv preprint arXiv:1806.03287, 2018.

Weina Wang, Lei Ying, and Junshan Zhang. On the relation between identifiability, differential privacy, and mutual-information privacy. IEEE Transactions on Information Theory, 62(9):5018-5029, 2016.

Z. Wang, A. C. Bovik, H. R. Sheikh, and E. P. Simoncelli. Image Quality Assessment: From Error Visibility to Structural Similarity. IEEE Transactions on Image Processing, 13(4):600-612, April 2004. doi: 10.1109/TIP.2003.819861.

Yandong Wen, Zhifeng Li, and Yu Qiao. Latent factor guided convolutional neural networks for age-invariant face recognition. In Proceedings of the IEEE conference on computer vision and pattern recognition, pp. 4893-4901, 2016.

Yandong Wen, Kaipeng Zhang, Zhifeng Li, and Yu Qiao. A discriminative feature learning approach for deep face recognition. In European conference on computer vision, pp. 499-515. Springer, 2016.

Jason Yosinski, Jeff Clune, Yoshua Bengio, and Hod Lipson. How transferable are features in deep neural networks? Advances in neural information processing systems, 27, 2014.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for privacy preservation for machine learning networks, the method comprising:

splitting a trained neural network into a first part and a second part, wherein the first part is a privacy preservation (PP) encoder and the second part is a PP machine learning (ML) model, retraining the PP encoder and the PP ML model, comprising:

determining an intra-class reduction loss based on a dimension reduction block and an intra-class distance reduction layer;

determining an inter-class maximization loss based on the dimension reduction block and the intra-class distance reduction layer; and retraining parameters of the PP encoder based on using a loss function, the intra-class reduction loss, the inter-class maximization loss, and a lambda coefficient;

providing the retrained PP encoder to a client device; and receiving a data representation of raw data from the client device, the data representation having been generated based on the raw data input into the retrained PP encoder by the client device.

2. The method of claim 1, further comprising:

inputting the data representation of the raw data into the PP ML model to generate a ML answer; and providing the ML answer to the client device.

3. The method of claim 2, wherein the trained neural network is used for image recognition, and wherein the raw data comprises one or more raw images and the data representation of the raw data is a vector representation of the one or more raw images.

4. The method of claim 1, wherein splitting the trained neural network into the first part and the second part comprises:

determining a split point between two layers of the trained neural network; and splitting the trained neural network using the split point, wherein the first part is a first set of layers with a layer at an input of the trained neural network, and wherein the second part is a second set of layers with a layer at an output of the trained neural network.

5. The method of claim 4, wherein retraining the PP encoder and the PP ML model comprises:

retraining parameters of the first set of layers using a new loss function, wherein the new loss function decreases an intra-class distance of output from the PP encoder; and retraining parameters of the second set of layers using the new loss function.

6. The method of claim 5, wherein the new loss function is used for optimization for the trained neural network.

7. The method of claim 1, wherein retraining the PP encoder and the PP ML model comprises:

providing the dimension reduction block and the intra-class distance reduction layer after the PP encoder, wherein the dimension reduction block and the intra-class distance reduction layer are used to retrain the PP encoder.

8. The method of claim 7, wherein retraining the PP encoder and the PP ML model further comprises:

providing the PP ML model and the inter-class distance maximization layer after the PP encoder, wherein the PP ML model and the inter-class distance maximization layer are parallel to the dimension reduction block and the intra-class distance reduction layer, and wherein the PP ML model and the inter-class distance maximization layer are used to retrain the PP encoder.

9. The method of claim 8, wherein retraining the PP encoder and the PP ML model further comprises:

freezing parameters of the intra-class distance reduction layer; and based on freezing the parameters of the intra-class distance reduction layer, performing back-propagation using the PP ML model and the inter-class distance maximization layer to retrain the PP encoder and the PP ML model.

10. The method of claim 9, wherein retraining the PP encoder and the PP ML model further comprises:

based on determining that the retraining of the PP encoder and the PP ML model are not finished:

iteratively freezing either parameters of the intra-class distance reduction layer or parameters of the intra-class distance reduction layer; and performing back-propagation to continue retraining of the PP encoder and the PP ML model; and based on determining that the retraining of the PP encoder and the PP ML model has finished:

providing the retrained PP encoder to the client device for use for a ML task.

11. A server for privacy preservation for machine learning networks, the server comprising one or more hardware processors configured to:

split a trained neural network into a first part and a second part, wherein the first part is a privacy preservation (PP) encoder and the second part is a PP machine learning (ML) model;

retrain the PP encoder and the PP ML model, comprising:

determining an intra-class reduction loss based on a dimension reduction block and an intra-class distance reduction layer;

determining an inter-class maximization loss based on the dimension reduction block and the intra-class distance reduction layer;

retraining parameters of the PP encoder based on using a loss function, the intra-class reduction loss, the inter-class maximization loss, and a lambda coefficient;

provide the retrained PP encoder to a client device;

receive a data representation of raw data from the client device, the data representation having been generated by the client device based on the raw data input into the retrained PP encoder; and provide an ML answer to the client device based on the retrained PP ML model and the data representation.

12. A method for privacy preservation for machine learning networks, the method comprising:

splitting a trained neural network into a first part and a second part, wherein the first part is a privacy preservation (PP) encoder and the second part is a PP machine learning (ML) model;

retraining the PP encoder and the PP ML model, comprising:

freezing parameters of an intra-class distance reduction layer; and based on freezing the parameters of the intra-class distance reduction layer, performing back-propagation using the PP ML model and an inter-class distance maximization layer to retrain the PP encoder and the PP ML model;

providing the retrained PP encoder to a client device; and receiving a data representation of raw data from the client device, the data representation having been generated based on the raw data input into the retrained PP encoder by the client device.

13. The method of claim 12, further comprising:

inputting the data representation of the raw data into the PP ML model to generate a ML answer; and providing the ML answer to the client device.

14. The method of claim 12, wherein retraining the PP encoder and the PP ML model comprises:

providing a dimension reduction block and the intra-class distance reduction layer after the PP encoder, wherein the dimension reduction block and the intra-class distance reduction layer are used to retrain the PP encoder.

15. The method of claim 14, wherein retraining the PP encoder and the PP ML model comprises:

providing the PP ML model and the inter-class distance maximization layer after the PP encoder, wherein the PP ML model and the inter-class distance maximization layer are parallel to the dimension reduction block and the intra-class distance reduction layer, and wherein the PP ML model and the inter-class distance maximization layer are used to retrain the PP encoder.

16. The method of claim 12, wherein retraining the PP encoder and the PP ML model further comprises:

based on determining that the retraining of the PP encoder and the PP ML model are not finished:

iteratively freezing either parameters of the intra-class distance reduction layer or parameters of the intra-class distance reduction layer; and performing back-propagation to continue retraining of the PP encoder and the PP ML model; and based on determining that the retraining of the PP encoder and the PP ML model has finished:

providing the retrained PP encoder to the client device for a ML task.

\* \* \* \* \*